United States Patent [19]

Albers et al.

[11] Patent Number: 5,066,352
[45] Date of Patent: Nov. 19, 1991

[54] METHOD AND APPARATUS FOR FORMING COMPOSITE PIECES FROM COMPOSITE SHEET MATERIAL

[75] Inventors: Stephen J. Albers, Norwood; Michael N. Grimshaw; David A. Peterson, both of Milford; John H. Pugh, Mt. Carmel; Jerry D. Wisbey, Cincinnati, all of Ohio

[73] Assignee: Cincinnati Milacron Inc., Cincinnati, Ohio

[21] Appl. No.: 484,728

[22] Filed: Feb. 23, 1990

[51] Int. Cl.$^5$ .............................................. B32B 31/00
[52] U.S. Cl. ..................... 156/265; 156/264; 156/265; 156/300; 156/521; 156/522; 156/552; 242/56 A; 242/56 R; 83/628; 83/694
[58] Field of Search ............... 156/384, 516, 519, 521, 156/552, 522, 265, 264, 267, 300; 242/56 A, 56 R; 83/622, 628, 694

[56] References Cited

U.S. PATENT DOCUMENTS

| | | | |
|---|---|---|---|
| 3,730,036 | 5/1973 | Bathory | 83/628 X |
| 3,840,421 | 10/1974 | Peterson | 156/384 |
| 4,176,566 | 12/1979 | Patterson et al. | 83/29 |
| 4,476,756 | 10/1984 | Pearl et al. | 83/422 |
| 4,514,246 | 4/1985 | Forrer et al. | 156/264 |
| 4,620,466 | 11/1986 | Jumel et al. | 83/177 |
| 4,627,886 | 12/1986 | Grone et al. | 156/361 |
| 4,664,736 | 5/1987 | Faasse, Jr. | 156/519 X |
| 4,675,062 | 6/1987 | Instance | 156/552 X |
| 4,678,133 | 7/1987 | Suzuki | 242/56 A |
| 4,708,761 | 11/1987 | Taniguchi et al. | 156/516 |
| 4,770,358 | 9/1988 | Suzuki et al. | 243/56 A |
| 4,785,695 | 11/1988 | Riley | 83/622 X |

OTHER PUBLICATIONS

Textbook: Design Engineering Project, by M. F. Spotts, 1968, p. 224 Cincinnati Milacron publication No. SP-152-3, May, 1988, pp. 14, 15, 17, 20, 21.

Primary Examiner—David A. Simmons
Assistant Examiner—J. Sells
Attorney, Agent, or Firm—Thomas M. Farrell; Frank C. Leach, Jr.

[57] ABSTRACT

A gripper on a powered gantry, which moves longitudinally relative to a porous conveyor belt, pulls a selected length of a composite sheet material and its backing from a supply roll on a carrousel and past a cutter. After a segment has been cut, the gantry returns the gripper to pull the composite sheet and its backing from the supply roll while the belt moves the segment thereon to a desired position thereon. This continues until the belt supports a plurality of segments. The gripper gantry includes a marker to mark each segment on the belt. After marking is completed, a powered gantry moves to dispose a top film over the segments. A powered gantry, which has a cutter thereon, is then moved so that the cutter, which can move orthogonal to the motion of the gantry and also has its reciprocating cutting blades rotatable about a vertical axis, can cut one or more pieces of desired shapes from each segment. After cutting is completed, the segments are advanced from the belt through a separator. The top film is fed through pinch rolls to pull all scrap downwardly after passing through the separator while each cut piece is advanced horizontally to a bottom film. The bottom film is connected to a first roller to wind the bottom film with the pieces theraround.

6 Claims, 20 Drawing Sheets

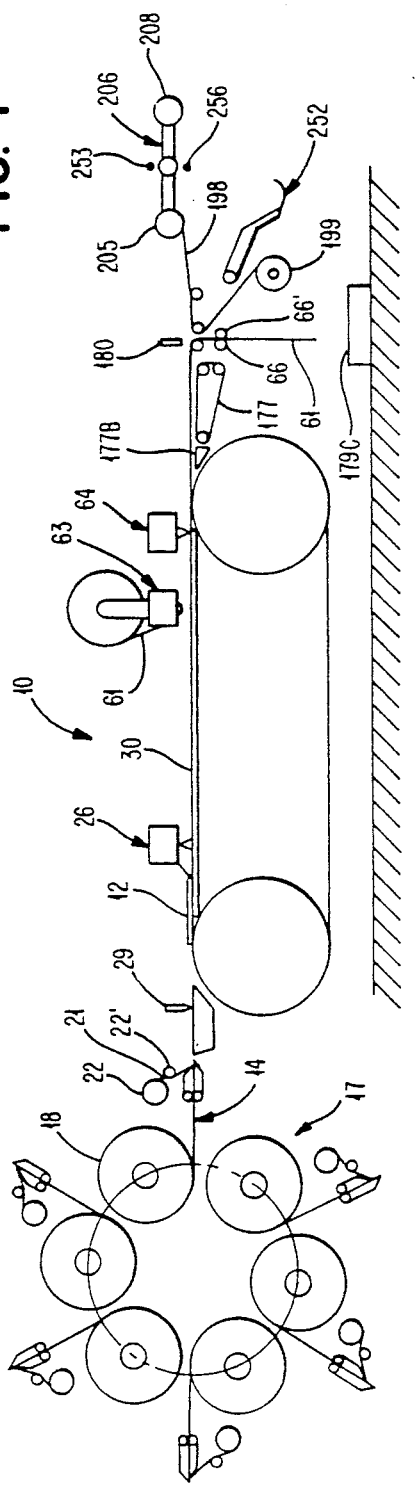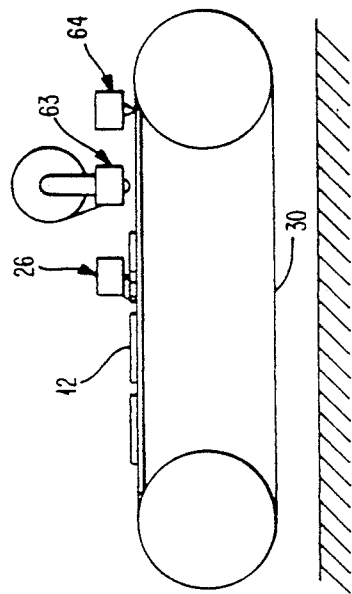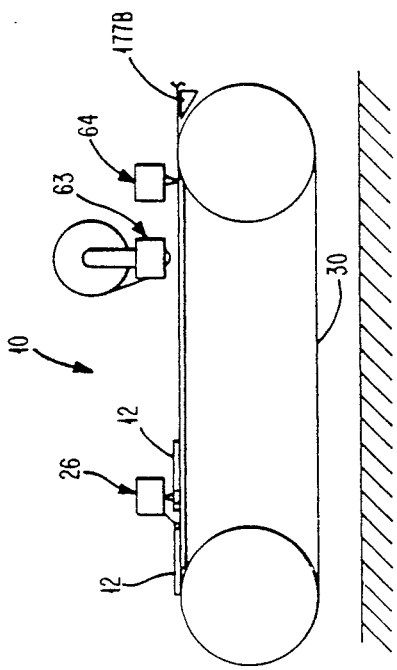

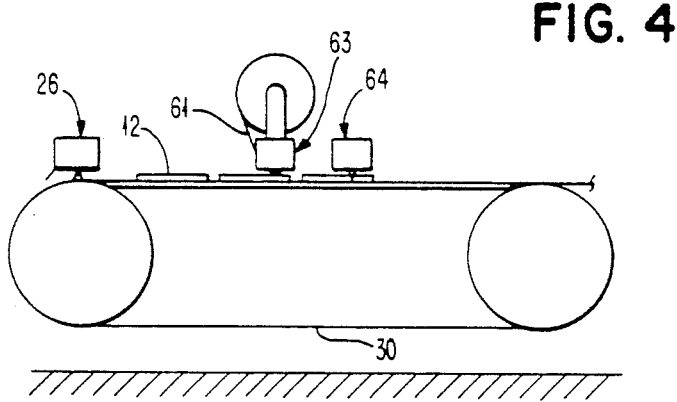
FIG. 4
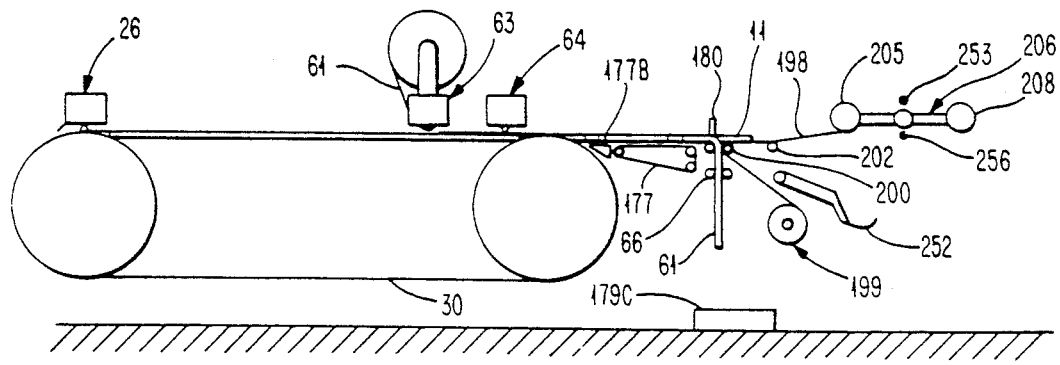
FIG. 5
FIG. 6
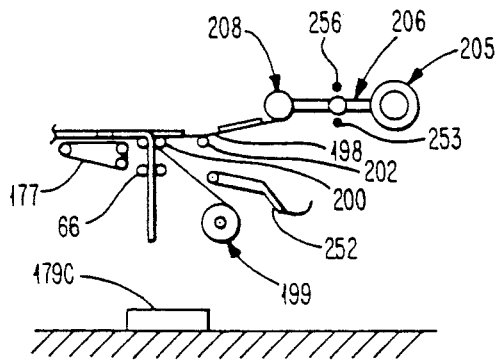
FIG. 7
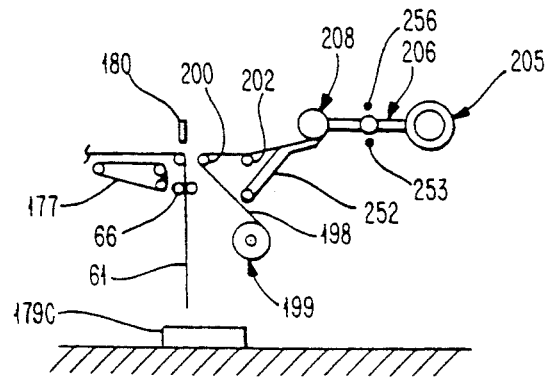

METHOD AND APPARATUS FOR FORMING COMPOSITE PIECES FROM COMPOSITE SHEET MATERIAL

This invention relates to a method and apparatus for forming shaped composite pieces from composite sheet material and, more particularly, to a method and apparatus for producing any selected shaped composite piece from a cut segment of composite sheet material and storing the composite pieces for later use.

It has been previously suggested to have an apparatus for forming selected shaped composite pieces from a composite sheet material supplied from a supply reel. The composite sheet material is pulled from the supply reel onto an upper surface of a first pallet, which is stationary at a first work station, by means on a first powered gantry grasping the composite sheet material on the supply reel and pulling it onto the upper surface of the stationary pallet. A cutter shears the composite sheet material, which has been pulled from the reel onto the upper surface of the pallet, to a programmed length.

The first powered gantry, which moves towards and away from the supply reel and over the first pallet, has an ink jet marking head for marking the cut segment of the composite sheet material on the first pallet. This marking may precisely outline the shape of the piece to be cut from the segment and any alphanumeric identification. This marking is accomplished by moving the first gantry towards the supply reel after the first gantry has been moved away from the supply reel to pull the composite sheet material onto the first pallet and by moving the marking head perpendicular to the movement of the first gantry.

The first pallet is then advanced to a second work station having a second powered gantry. At this second work station, a cutter, which is mounted on the second gantry and may be a water jet or a chisel cutter, for example, is moved by a control system relative to the composite sheet material on the first pallet.

The cutter is mounted on the second gantry for movement perpendicular to the direction in which the second gantry is moved. The second gantry is moved in the longitudinal direction of the composite sheet material.

It should be understood that more than one layer of the composite sheet material can be cut simultaneously. Therefore, if more than one layer of the composite sheet material is to be cut simultaneously, each layer of the composite sheet material must be manually placed on top of another layer of the composite sheet material at the first work station after marking is completed of the prior layer. Thus, a plurality of pieces of the same selected shape can be cut at the second work station from the stacked layers of composite sheet material.

After completing formation of one or more pieces of selected shapes from one or more layers of the composite sheet material on the first pallet at the second work station, the first pallet is shuttled to a third work station. At the third work station, the pieces of the selected shapes are manually stripped from the composite sheet material. The remainder of the composite sheet material is scrap, which is manually removed from the first pallet. The selected pieces are kitted manually. Then, the first pallet, which is empty, is automatically positioned to a lower level for return to the first work station.

When the first pallet at the first work station is advanced to the second work station, a second pallet, which has been returned to a lower level of the first work station from the third work station, is moved to the upper level of the first work station to receive the next segment of the composite sheet material from the supply reel. Cutting and marking of the segment on the second pallet occurs at the first work station while cutting of the pieces from the cut segment on the second pallet occurs at the second work station.

When the first pallet is advanced from the second work station to the third work station, the second pallet at the first work station is advanced to the second work station. Then, a third pallet is advanced from the lower level to which it was automatically positioned from the third work station to the first work station for reception of the composite sheet material from the supply reel for cutting the next segment.

This previously suggested apparatus requires manual stripping of the pieces from the segment and manually rolling the pieces on a roll or laying them on flat panels in a desired sequence to form a kit at the third work station. This increases the time and the cost.

Another problem with the previously suggested apparatus is that pieces are cut for optimum utilization of the composite sheet material to minimize waste. This causes the pieces to be scattered rather than being in the proper sequence so that the pieces must be manually placed in the proper sequence for later use.

Furthermore, if two of the pieces stick together and are put in one kit, then another kit is missing a piece, and no one would know where it is. The manual arrangement of the pieces also may result in a piece not being placed in a kit. Accordingly, whenever a piece is missing from a kit, the person, who is assembling the pieces, must stop because of the missing piece. This increases the cost in addition to delaying the assembly time of a part made from the pieces.

This previously suggested apparatus also requires pallets to transport the cut segment of the composite sheet material to the three work stations. The return of the pallets from the third work station to the first work station creates additional cost.

The previously suggested apparatus has no means for retaining the composite sheet material on the pallet during cutting of the pieces of precise shapes from the composite sheet material. The previously suggested apparatus also has no arrangement for protecting the composite sheet material on the supply reel from sticking while still being able to mark the segment of the composite sheet material at the first work station after it has been cut from the composite sheet material on the supply reel.

The present invention satisfactorily overcomes the foregoing problems of the previously suggested apparatus. The present invention automatically separates the selected shaped pieces from the remainder of the cut segment of the composite sheet material and then automatically forms a roll of the selected shaped pieces into a kit. A protective film is added to the bottom of the selected shaped pieces prior to forming them into a roll but after the selected shaped pieces have been separated from the scrap, which is diverted to another area.

The present invention eliminates the pallets and the expensive pallet return arrangement through utilizing conveyor means. The present invention also uses a vacuum system, which maintains a low vacuum level on the surface of the conveyor means to assist in the placement and transport of the cut segment of the composite sheet material. In addition, a higher level of vacuum is selectively applied to the area of the conveyor means upon which cutting of the selected shaped pieces from the cut segment is occurring to enhance cutting quality and precision.

The present invention uses a protective film above the composite sheet material to prevent sticking of portions of the material on the supply reel and parts of the material supply arrangement. This protective film is removed from the composite sheet material prior to cutting the same into segments and marking. The present invention also adds a protective film to the top of the cut segment of the composite sheet material after marking has been completed and prior to cutting of the piece or pieces of selected shapes from the cut segment.

U.S. Pat. No. 4,620,466 to Jumel et al discloses an apparatus for cutting a composite sheet material. Jumel et al has a single continuous strip of composite sheet material advanced from a supply reel. The material is prevented from sticking to a fixed table by an air cushion therebeneath; this air cushion prevents precise holding of the material when it is cut by a fluid jet, which can be moved perpendicular to the direction in which the material is advanced from the supply reel. During cutting by the fluid jet, the material can be moved towards or away from the supply reel to enable the fluid jet to produce various shaped pieces.

Jumel et al seems to depend upon the programmed cuts to produce only a selected shaped piece or a scrap for advancement from the fixed table to a conveyor. This would seem to substantially limit the selected shapes of the pieces.

Jumel et al does not sever the composite sheet material on the fixed table from the composite sheet material on the supply reel. This is because the composite sheet material must be capable of being returned towards the supply reel during cutting by the fluid jet. Thus, Jumel et al has movement of both the composite sheet material and the cutter relative to each other. This creates problems in precise cutting.

While Junel et al discloses either a scrap or a piece of a selected shape being advanced from the fixed table after being cut, it is questioned that only one of these two can be so advanced without the other. However, if it can, then separation of the piece from the scrap must occur at the cutter. Therefore, there is no separation of the piece from the scrap at a location downstream from the cutter so as to enable any shaped piece to be formed.

When automatically cutting composite sheet material, it is desired to be able to cut the composite sheet material at a high rate to have good productivity in automatically forming various shaped composite pieces from the composite sheet material. One means for producing the high rate of cutting is to employ a cutter having a reciprocating knife. However, this type of cutter has an inherent vibratory nature that creates excessive noise at the high rates of reciprocation necessary to have good productivity.

The present invention overcomes the problem of excessive noise at a high rate of reciprocation so as to enable the use of a cutter having a reciprocating knife. The present invention accomplishes this through moving two reciprocating knife blades alternately in opposite directions with the reciprocating knife blades and their driving mechanisms having acceleration forces equal in magnitude. By having the acceleration forces equal in magnitude but opposite in direction, the main source of vibration in the reciprocating knife blades is eliminated. Therefore, the excessive noise created by the vibration is no longer present with the cutter of the present invention.

An object of this invention is to provide a method and apparatus for forming selected shaped composite pieces from composite sheet material.

Another object of this invention is to retain selectively shaped composite pieces from a composite sheet material for use at a later time.

A further object of this invention is to provide a cutter having a pair of reciprocating knife blades capable of operating at a high rate of speed without excessive noise.

Still another object of this invention is to provide a cutter having a pair of reciprocating knife blades in which acceleration forces of a pair of reciprocating knife blades and their driving mechanisms are balanced so as to eliminate a source of vibration.

Other objects of this invention will be readily perceived from the following description, claims, and drawings.

The attached drawings illustrate a preferred embodiment of the invention, in which:

FIG. 1 is a schematic side elevational view of an apparatus of the present invention showing a first cut segment of the composite sheet material loaded on a conveyor belt;

FIG. 2 is a schematic side elevational view of a portion of the apparatus of FIG. 1 showing a second cut segment of the composite sheet material loaded on the conveyor belt;

FIG. 3 is a schematic side elevational view of a portion of the apparatus of FIG. 1, similar to FIG. 2, showing marking of each of the segments on the conveyor belt;

FIG. 4 is a schematic side elevational view of a portion of the apparatus of FIG. 1, similar to FIGS. 2 and 3, showing the application of a top cover film on each of the segments on the conveyor belt and cutting of each of the segments on the conveyor belt into one or more pieces;

FIG. 5 is a schematic side elevational view of a portion of the apparatus of FIG. 1 showing removal of scrap from each of the segments of composite sheet material and selected shaped pieces being rolled up on a roll with the prior application of a bottom film for the pieces whereby a kit is formed;

FIG. 6 is a schematic side elevational view of a portion of the apparatus of FIG. 1 showing changing of rolls upon completion of wrapping the pieces on one of the rolls;

FIG. 7 is a schematic side elevational view, similar to FIG. 6, of a portion of the apparatus of FIG. 1 showing the bottom film being wrapped around a roll;

Figure 9:
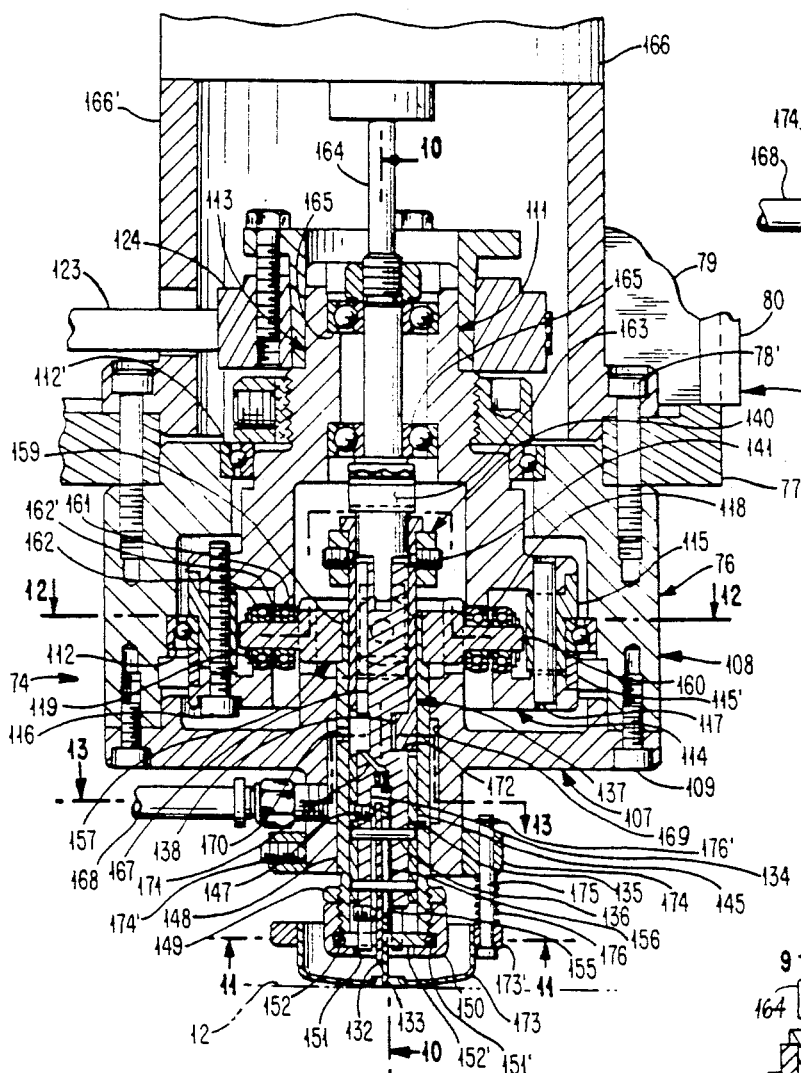
FIG. 9 is a longitudinal sectional view of a cutter of the apparatus of the present invention and taken along line 9—9 of FIG. 10.
Figure 13:
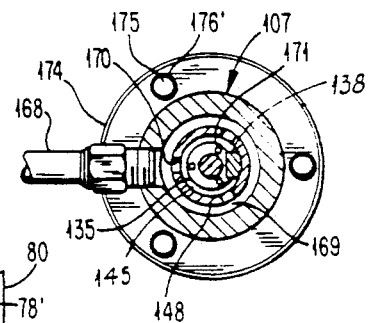
Figure 14:
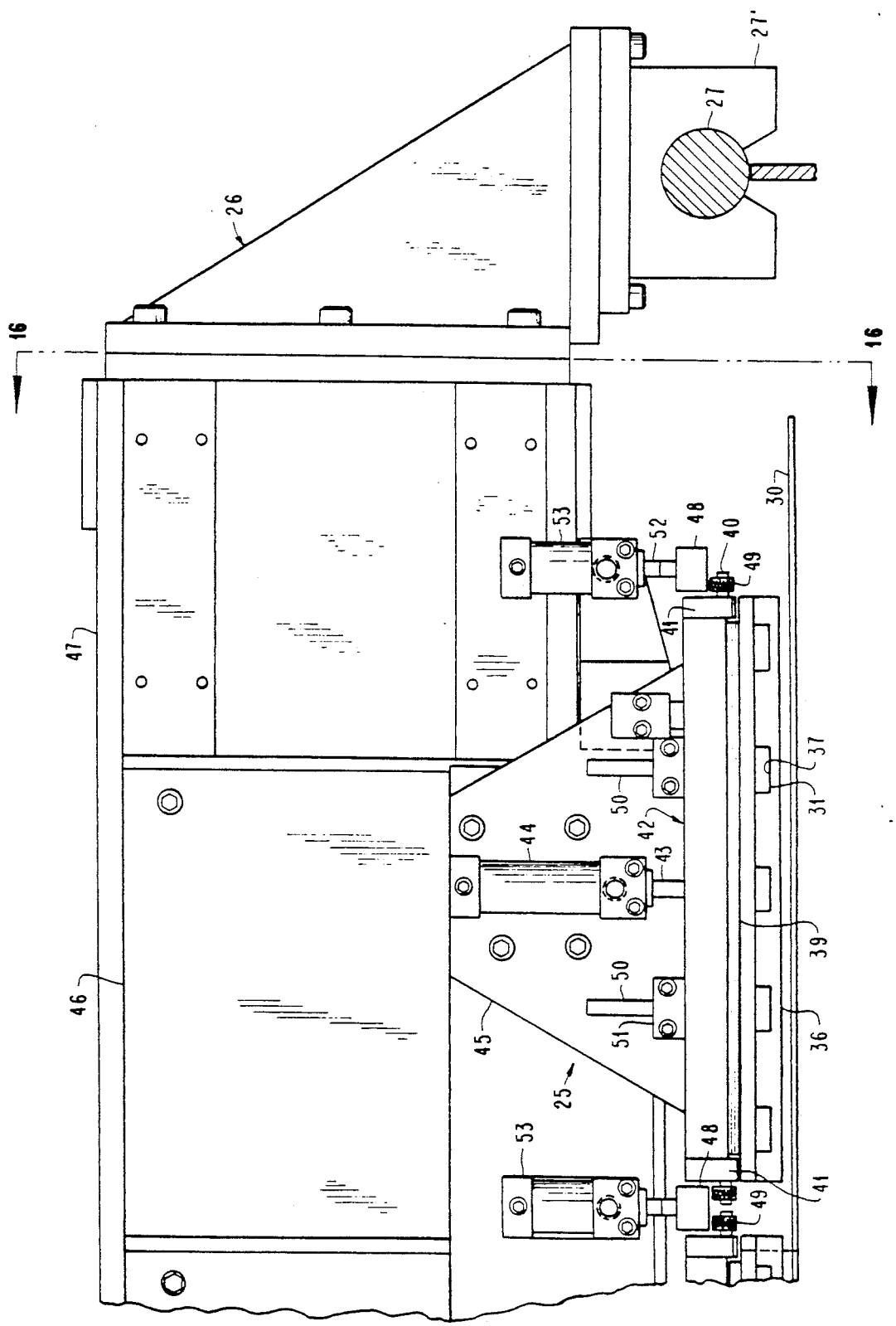
Figure 15:
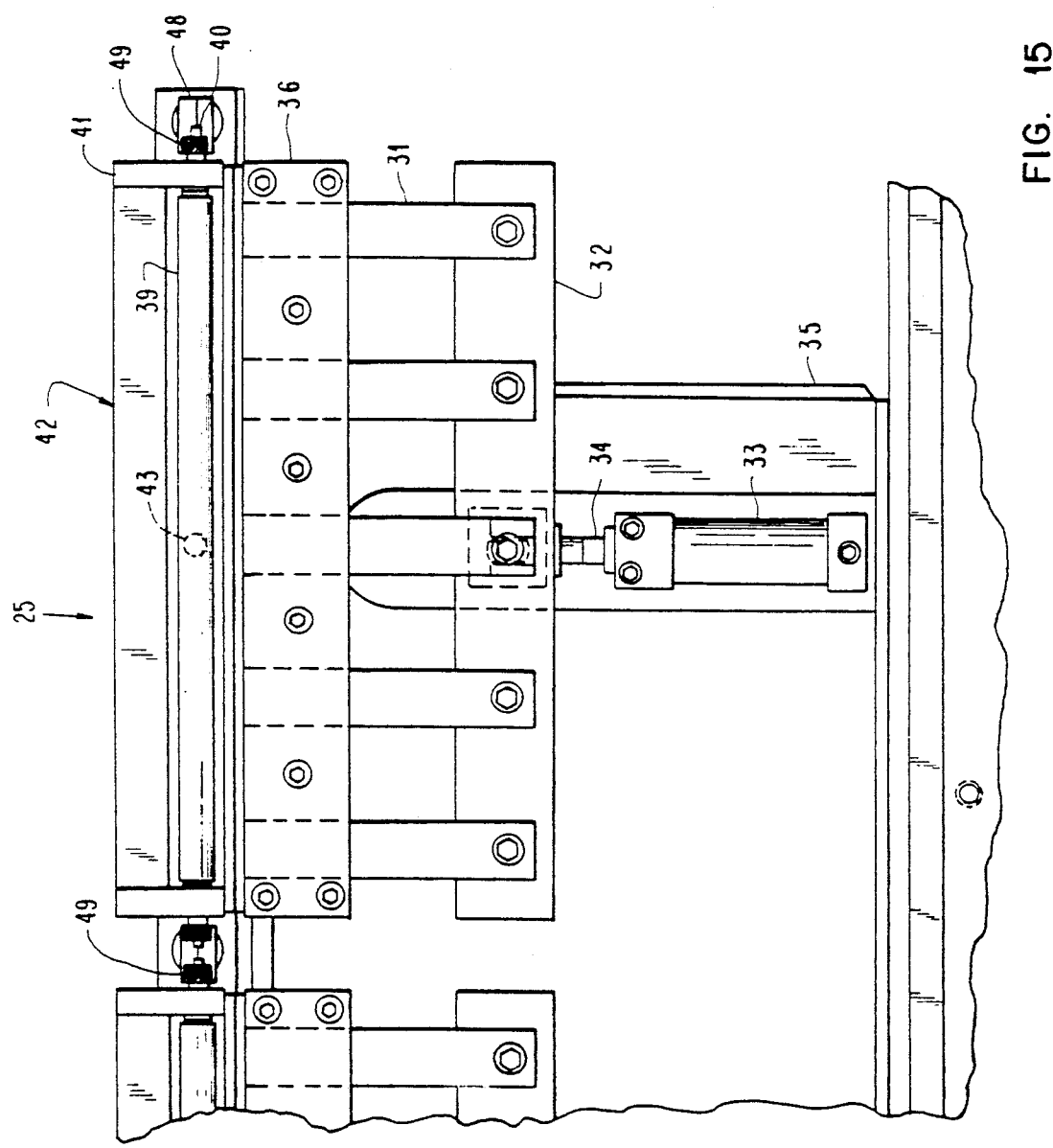
Figure 16:
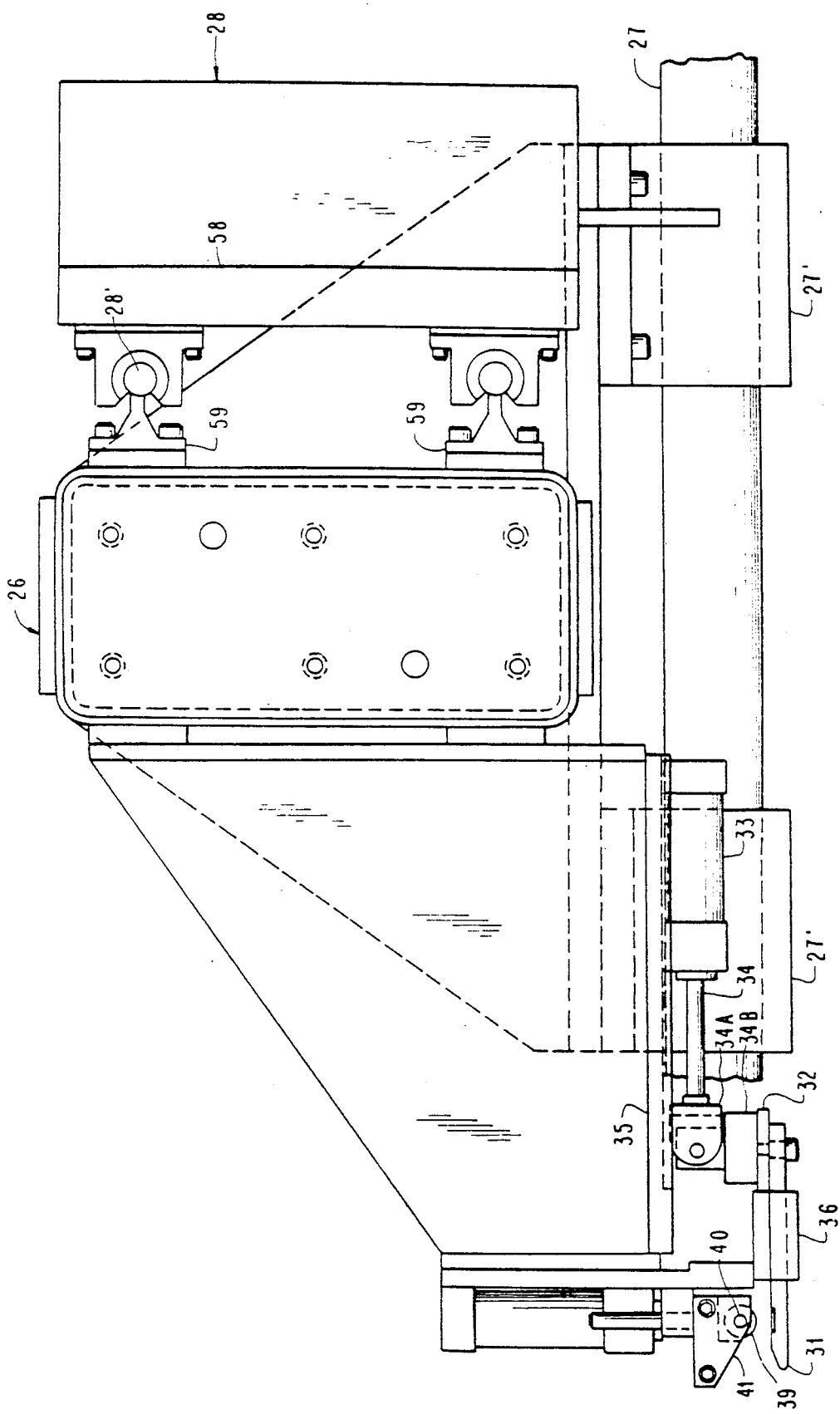
Figure 17:
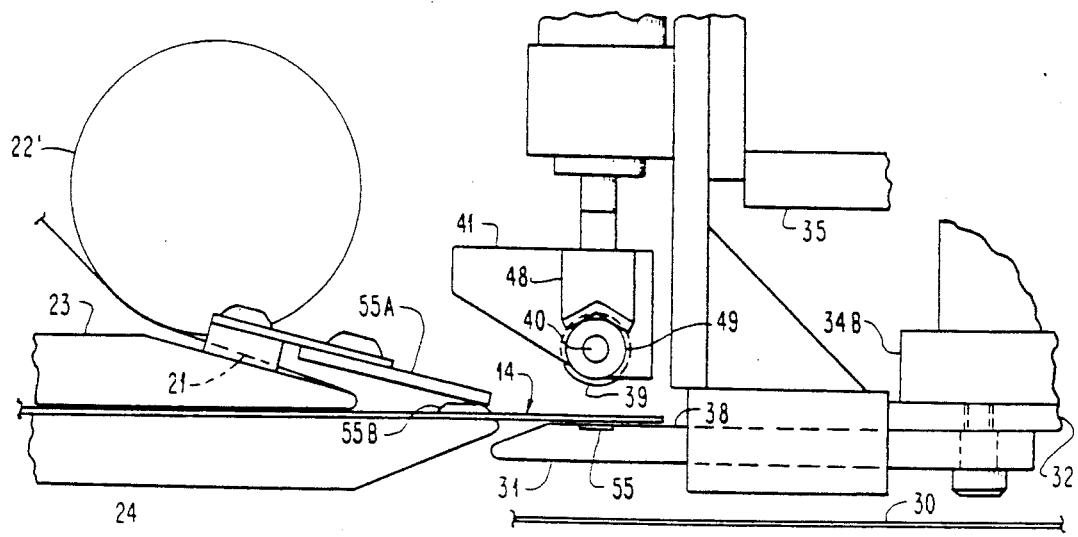
Figure 18:
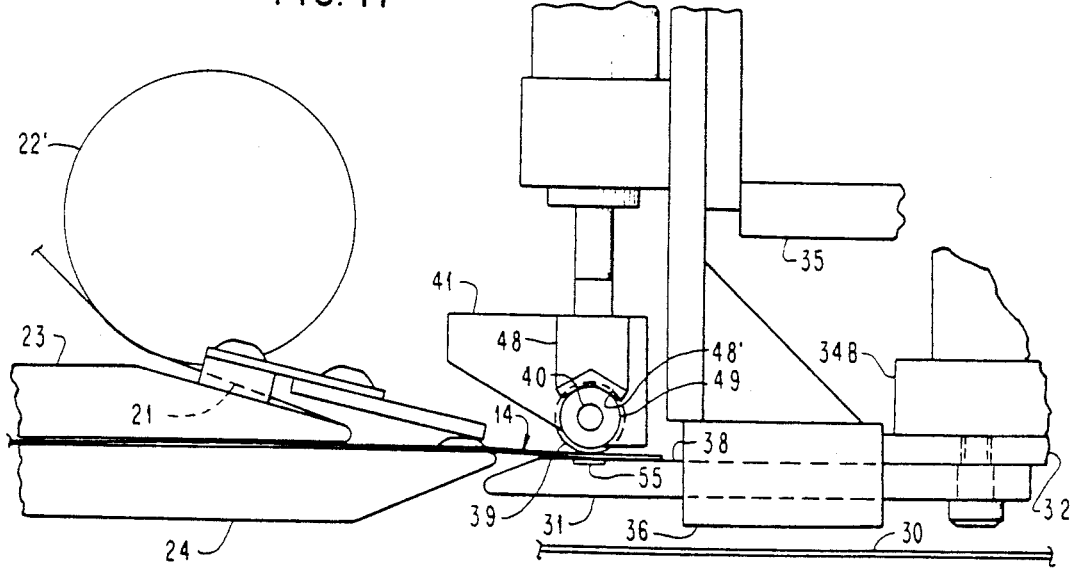
Figure 19:
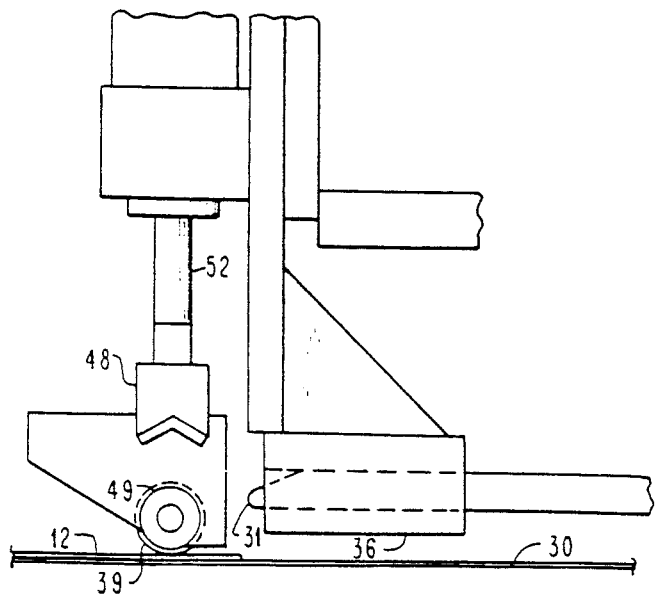
Figure 20:
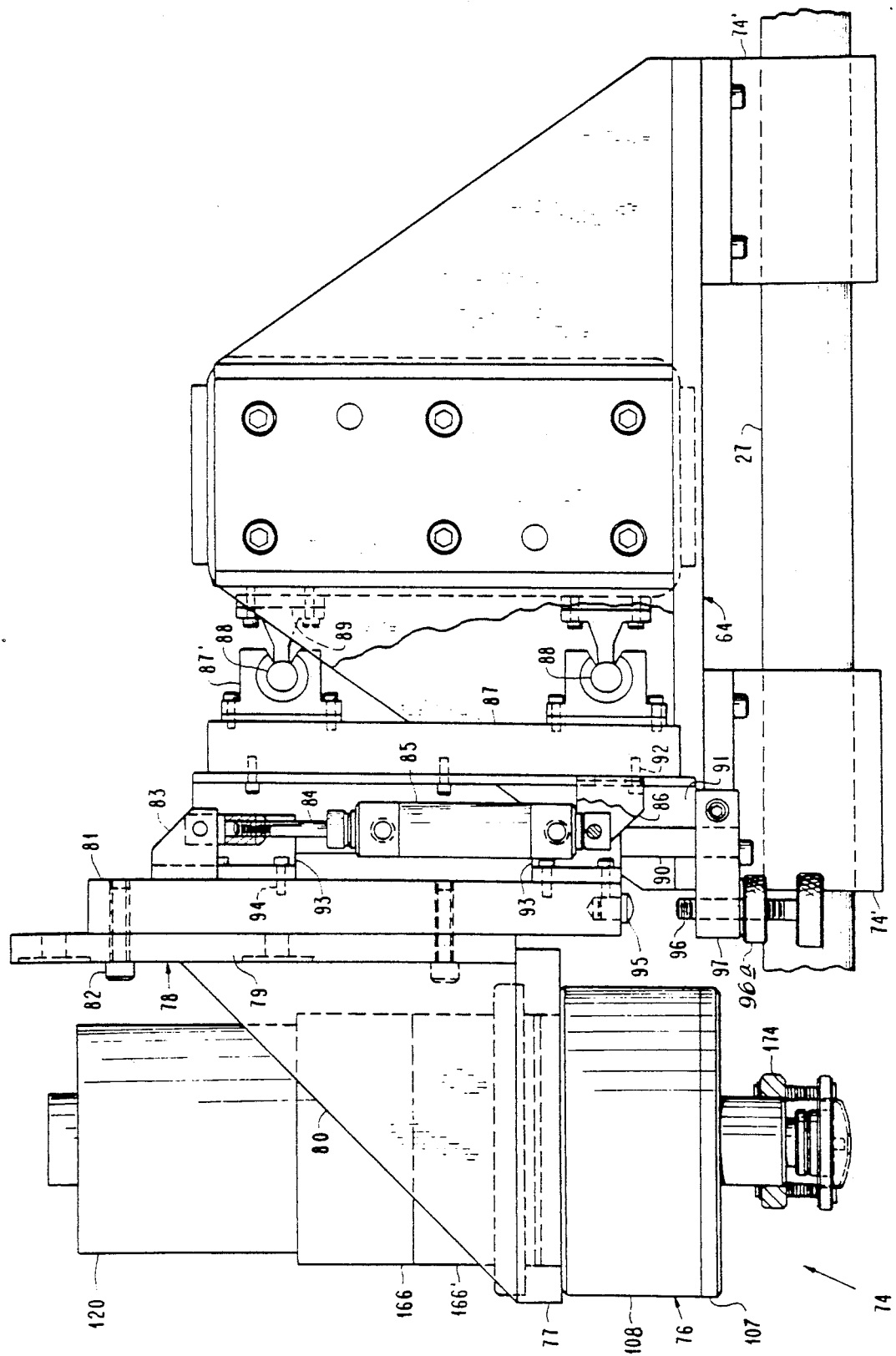
Figure 30:
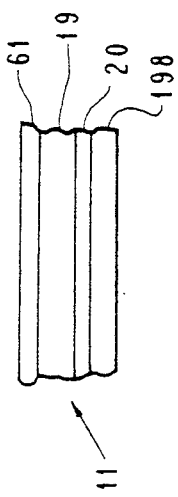
Figure 29:
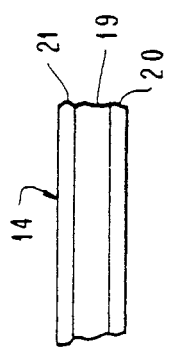
Figure 21:
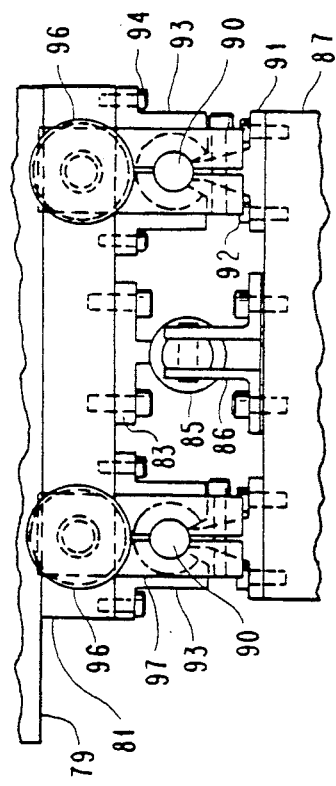
Figure 22:
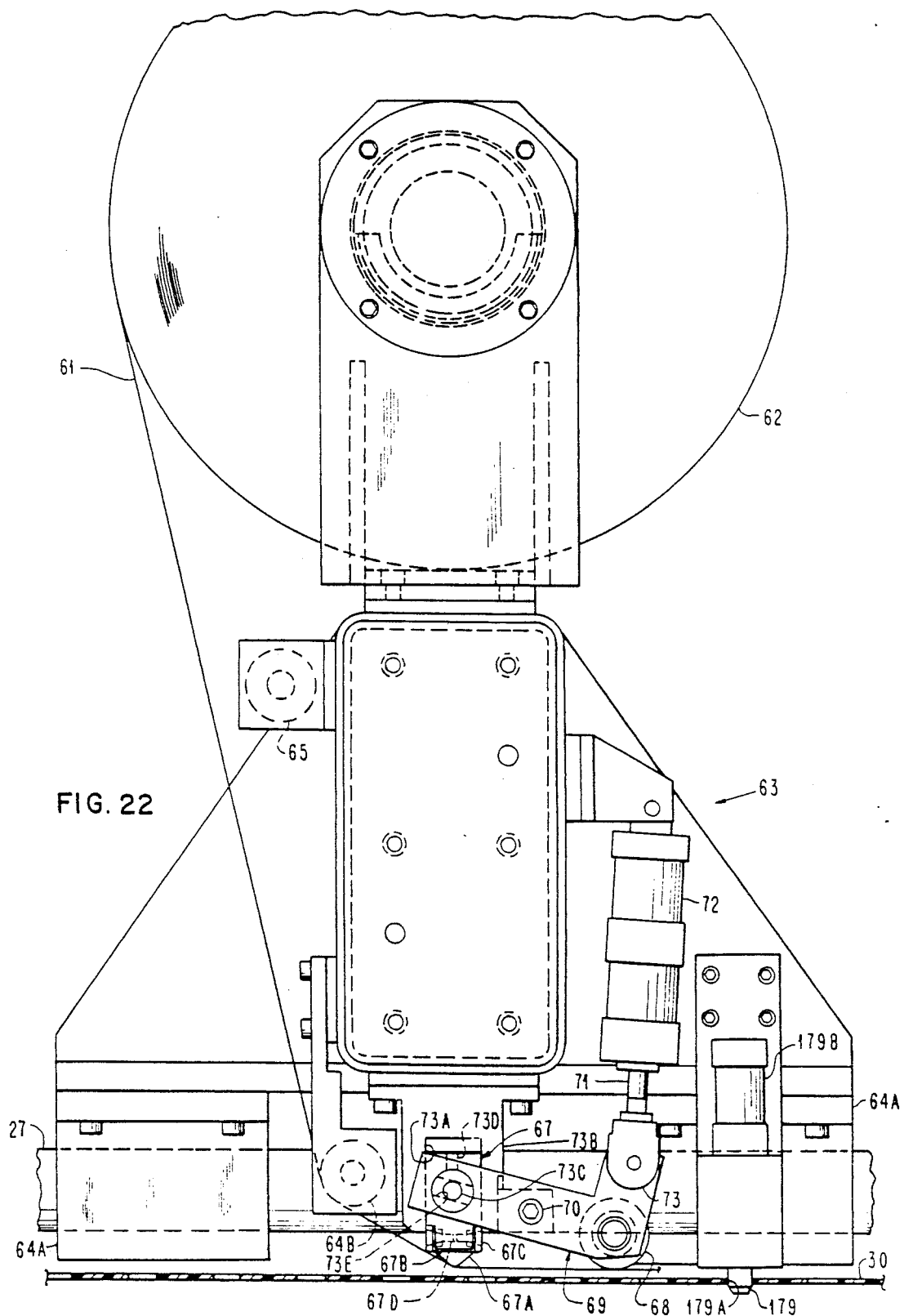
Figure 23:
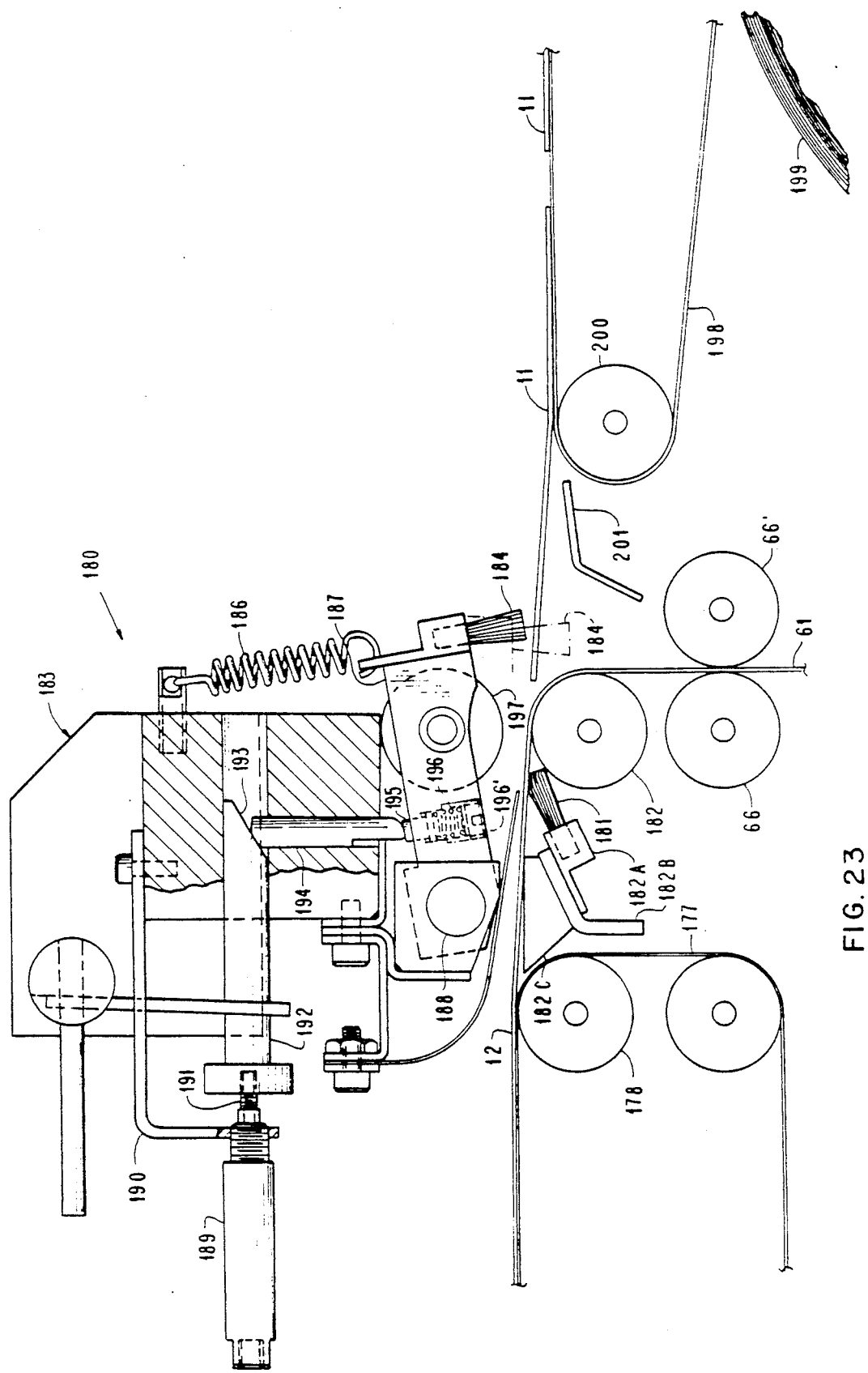
Figure 24:
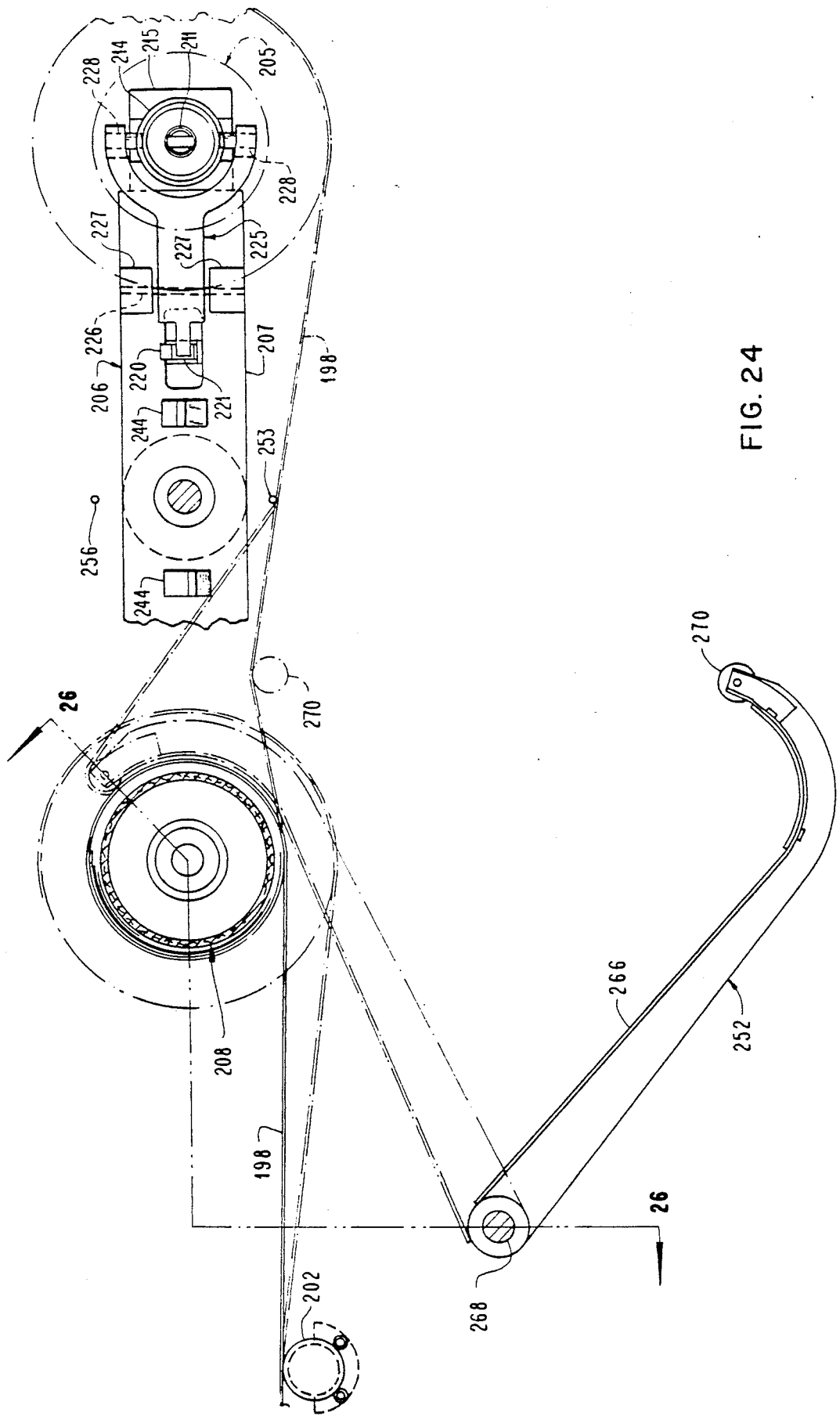
Figure 25:
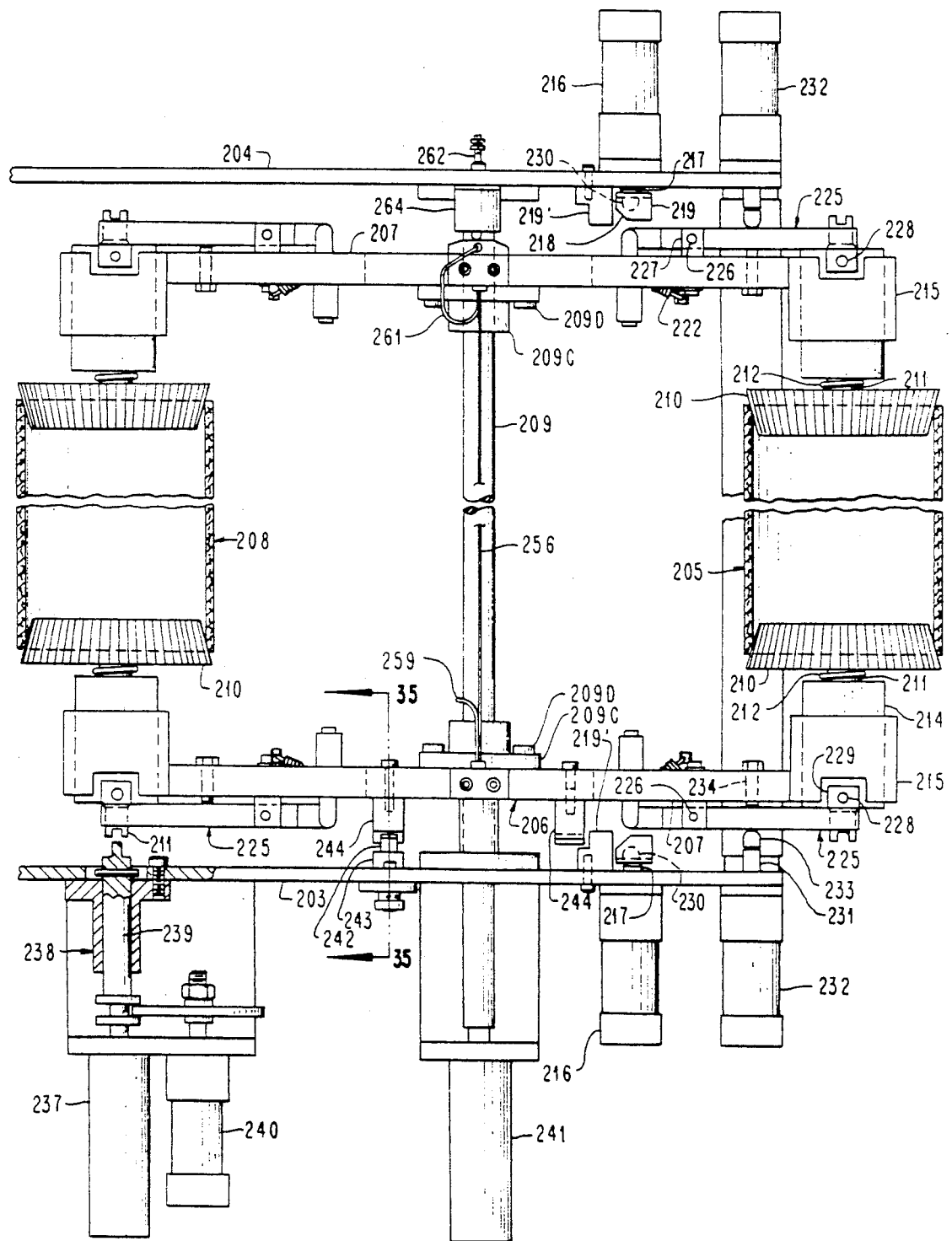
Figure 26:
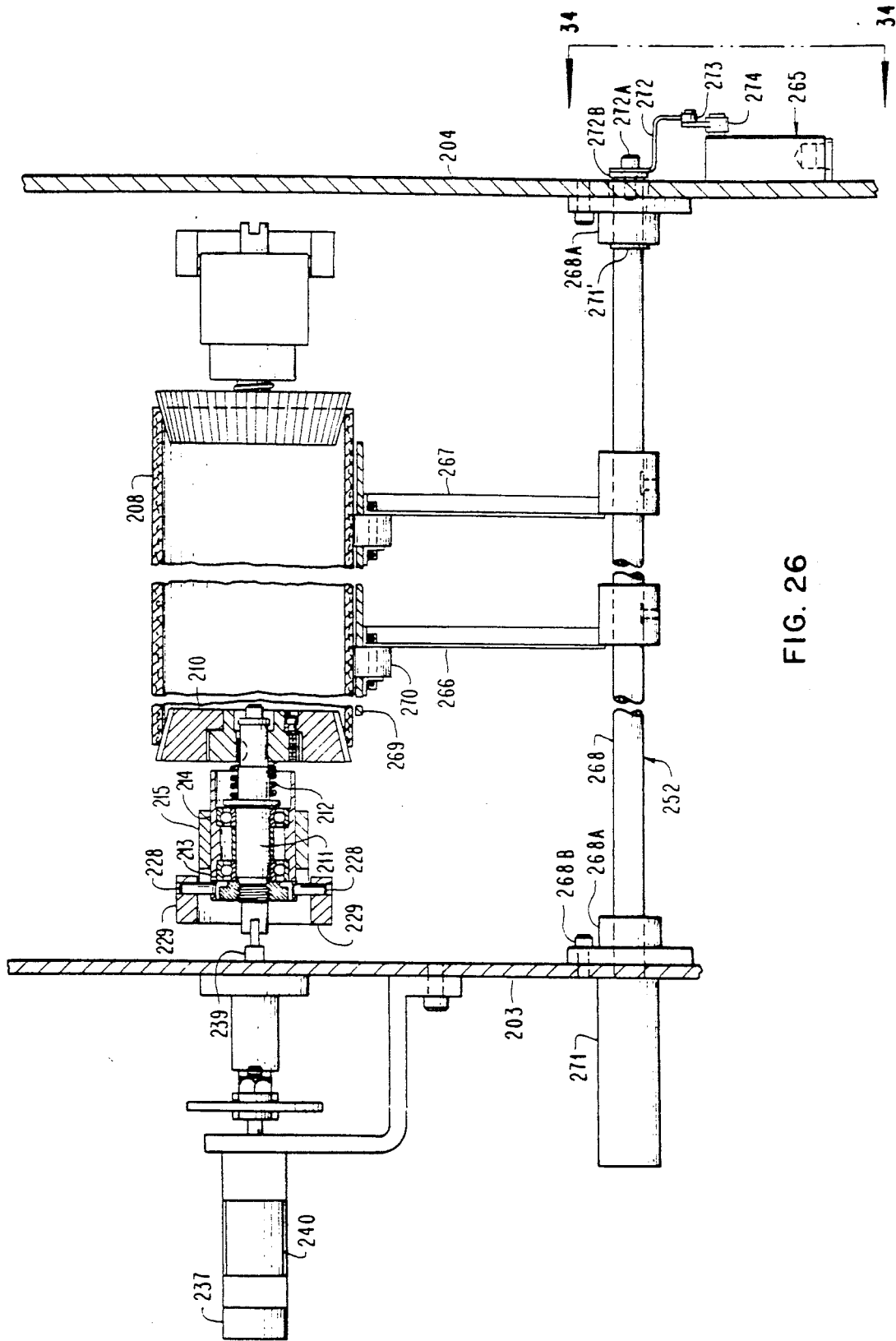
Figure 27:
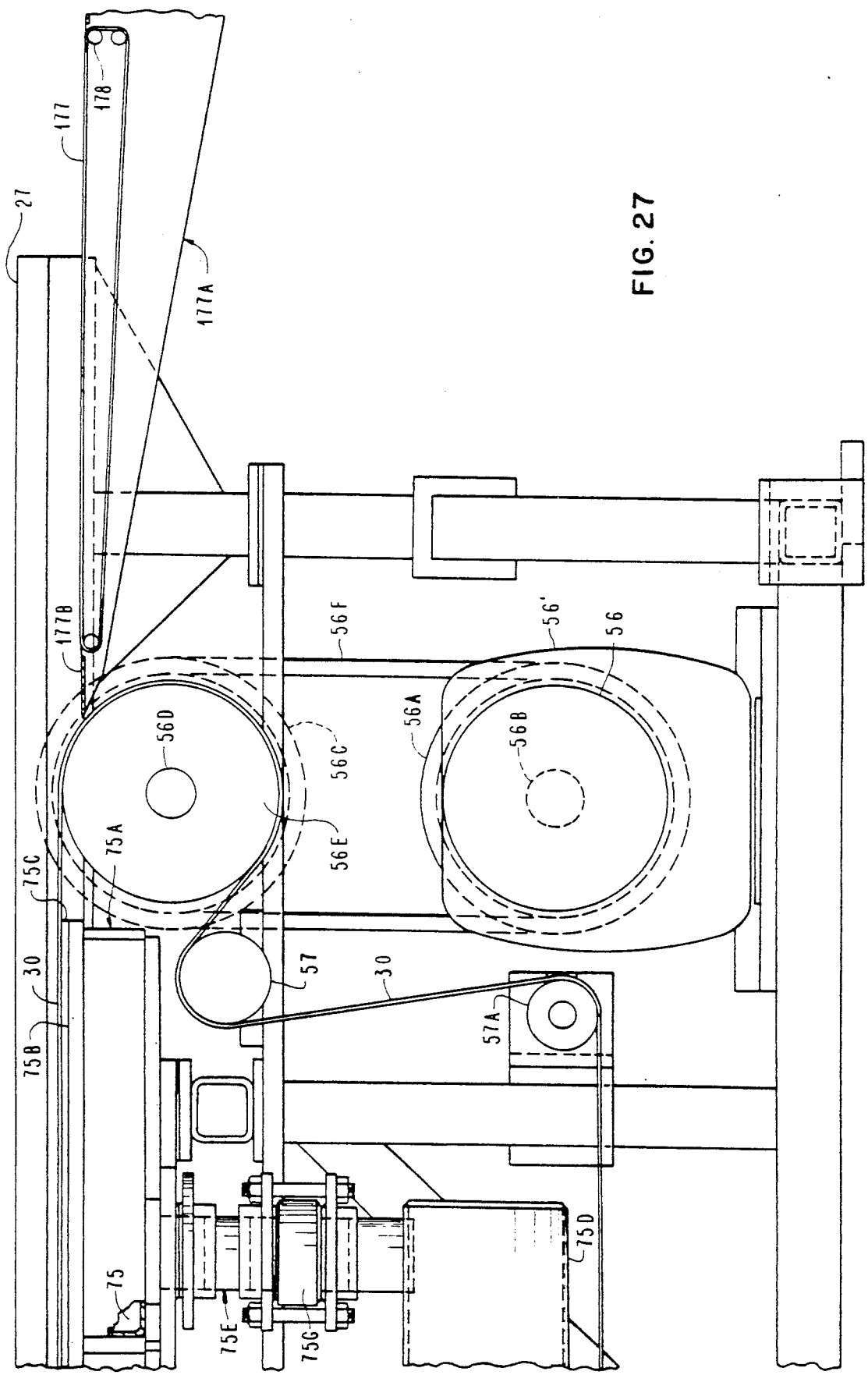
Figure 28:
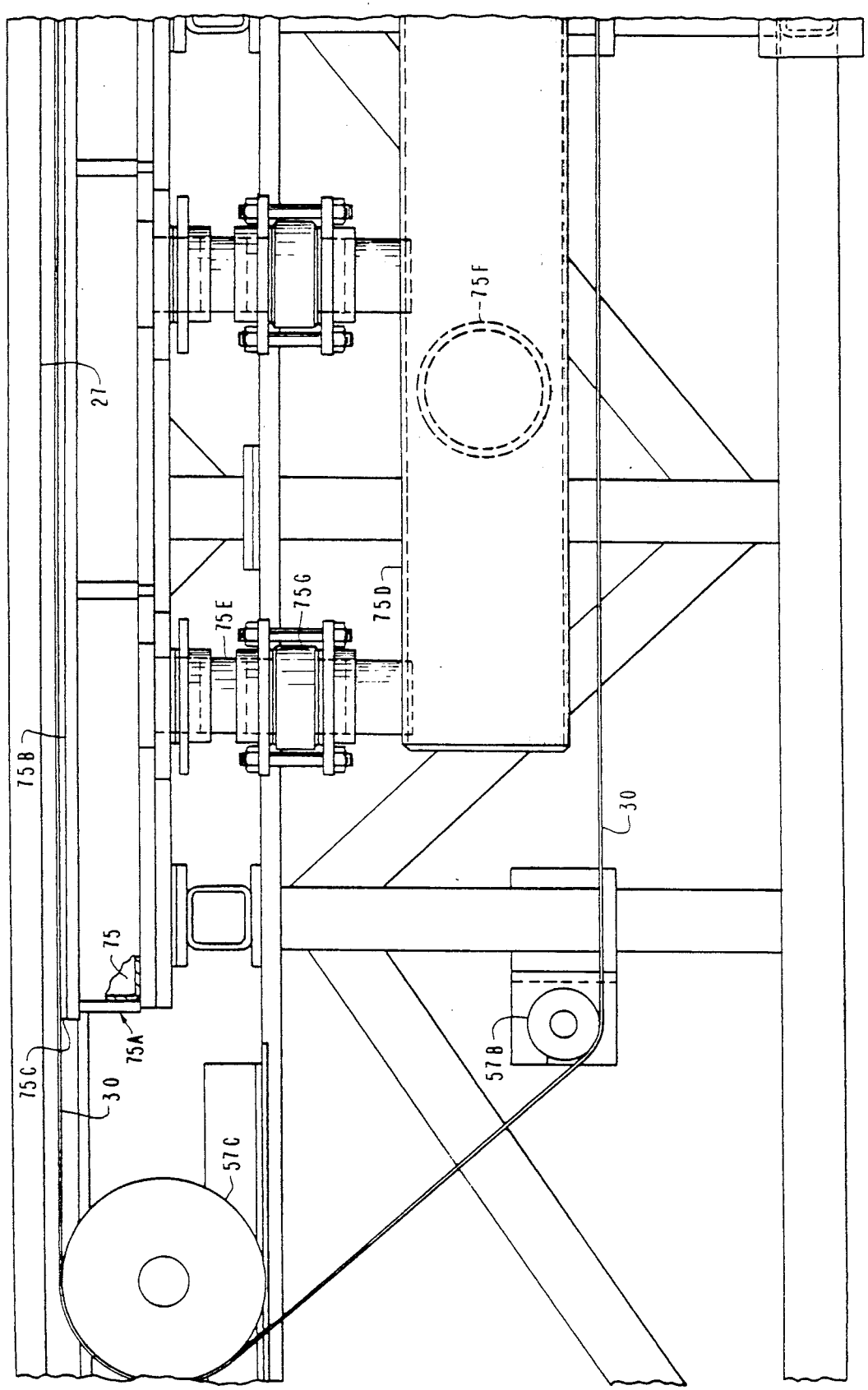
Figure 31:
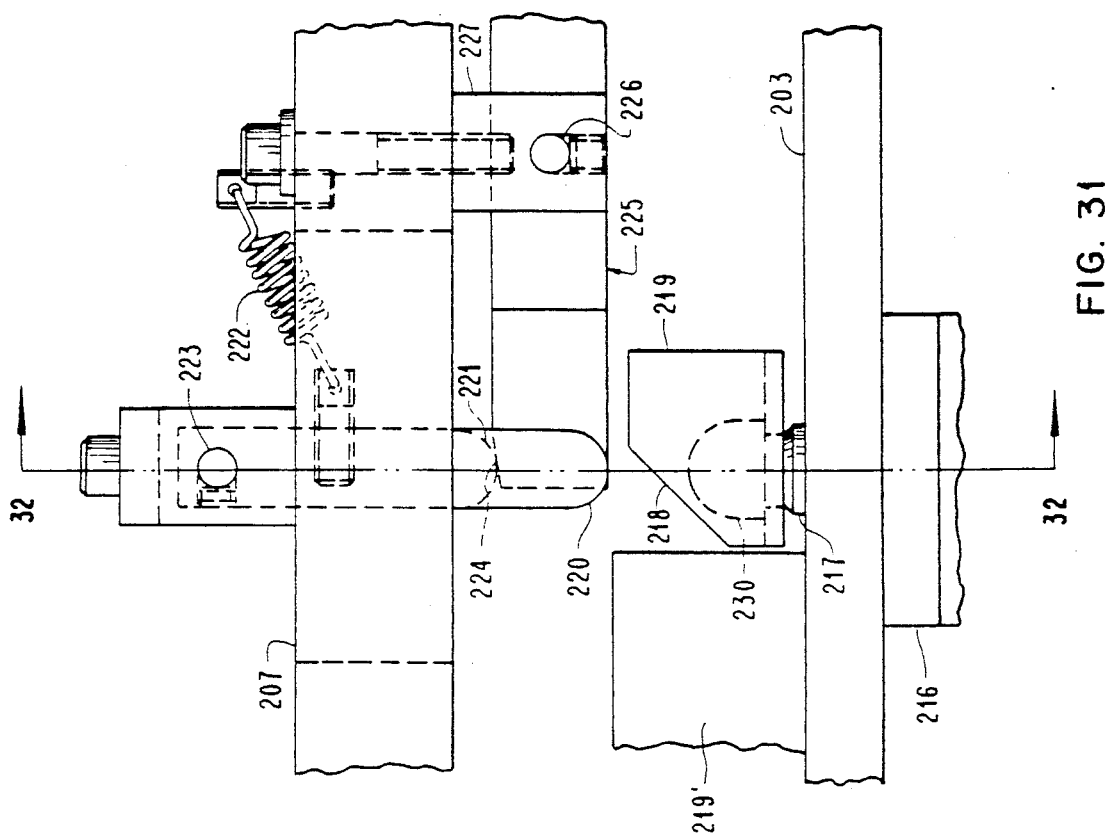
Figure 32:
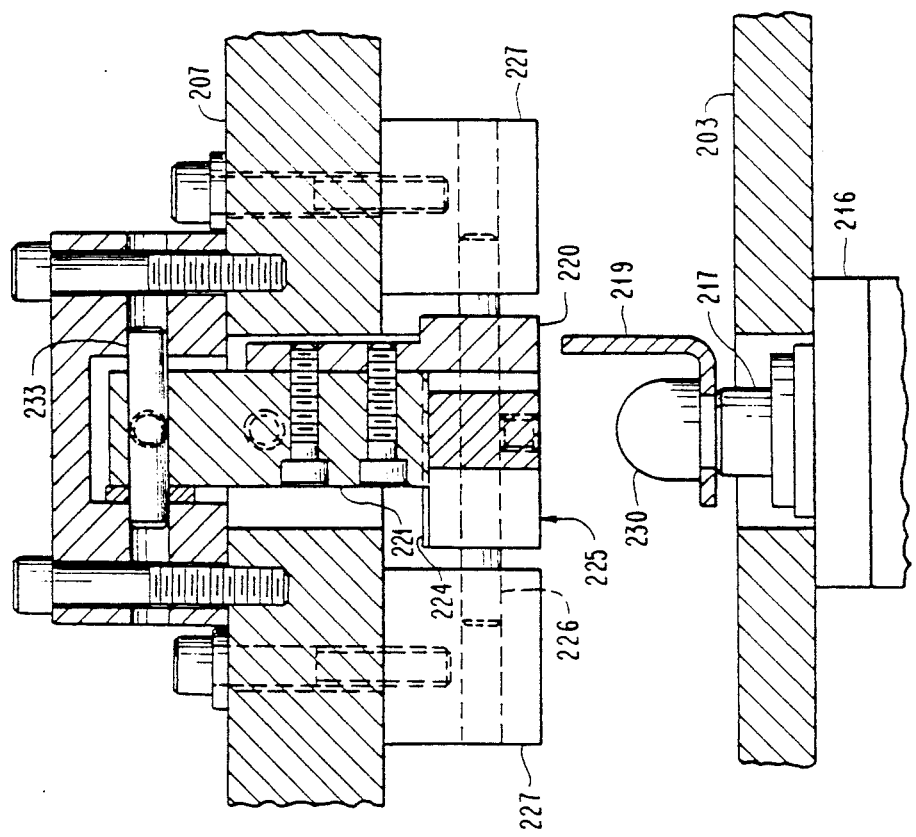
Figure 33:
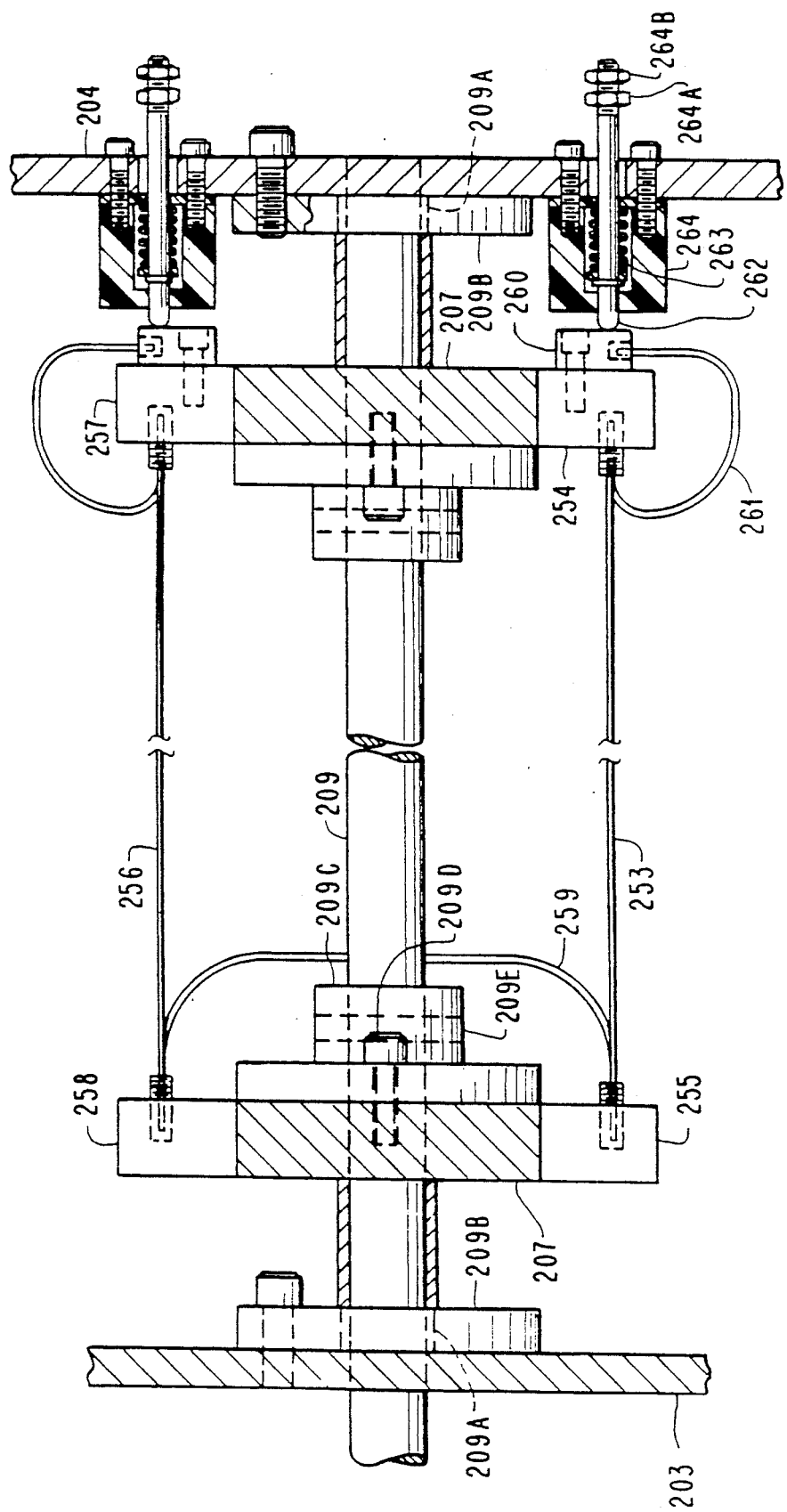
Figure 35:
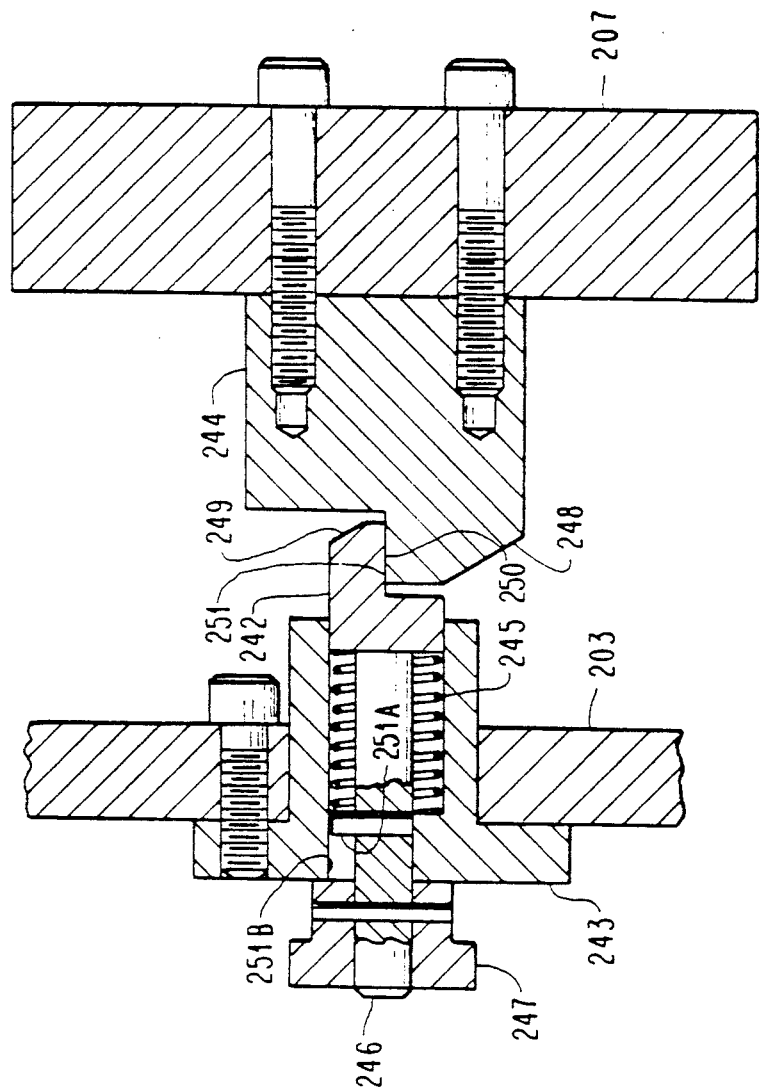
Figure 34:
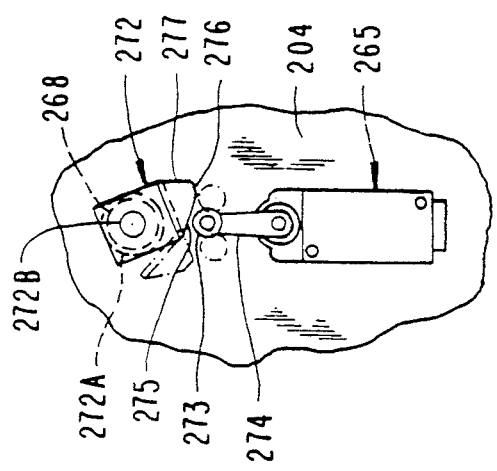

FIG. 13 ia a cross sectional view of a portion of the cutter of FIG. 9 and taken along line 13—13 of FIG. 9;

FIG. 14 is a fragmentary front elevational view of a portion of a first powered gantry showing a portion of a gripper for pulling the remainder of the composite assembly to be cut from a supply source;

FIG. 15 is a fragmentary bottom plan view of a portion of the gantry of FIG. 14;

FIG. 16 is a side elevational view of the gantry of FIG. 14 showing a marking device in addition to a portion of the gripper and taken along line 16—16 of FIG. 14;

FIG. 17 is a fragmentary schematic view of a portion of the gripper on the gantry of FIG. 14 for pulling the composite assembly past a cutter and of a portion of a supply roll structure;

FIG. 18 is a fragmentary schematic view, similar to FIG. 17, of a portion of the gripper on the gantry of FIG. 14 gripping the composite sheet material and its backing to pull them past a cutter and of a portion of a supply roll structure;

FIG. 19 is a fragmentary schematic view, similar to FIGS. 17 and 18, of a portion of the gripper of the gantry of FIG. 14 for pulling the composite sheet material and its backing past a cutter after cutting of a segment from the composite sheet material and its backing has been completed but without the portion of the support roll structure;

FIG. 20 is a fragmentary side elevational view of a portion of a powered gantry having the cutter of FIG. 9;

FIG. 21 is a fragmentary bottom plan view of a portion of FIG. 20;

FIG. 22 is a side elevational view of a powered gantry having an arrangement for applying a protective film to the top of each segment to be cut prior to it being cut;

FIG. 23 is a schematic side elevational view of a separator of the apparatus of FIG. 1 for separating pieces cut from each segment and showing a bottom film being supplied;

FIG. 24 is a fragmentary side elevational view of a portion of the apparatus of FIG. 1 showing the arrangement for cutting and wrapping a bottom film for supporting cut pieces on a roller;

FIG. 25 is a fragmentary top plan view, partly in section, of a portion of the apparatus of FIG. 24;

FIG. 26 is a fragmentary sectional view, partly in elevation, of a portion of the apparatus of FIG. 24 and taken along line 26—26 of FIG. 24;

FIG. 27 is a side elevational view of a portion of the apparatus of FIG. 1 showing the right portion of the porous conveyor belt, the drive arrangement for the porous conveyor belt, an auxiliary conveyor, and a portion of the vacuum system;

FIG. 28 is a side elevational view of a left portion of the porous conveyor belt and another portion of the vacuum system;

FIG. 29 is an enlarged fragmentary side elevational view of a portion of composite assembly before its top protective film is removed;

FIG. 30 is an enlarged fragmentary side elevational view of a cut piece with the bottom protective film;

FIG. 31 is an enlarged fragmentary top plan view of a portion of the apparatus of FIG. 25 showing the relationship between a latch and a shifter fork;

FIG. 32 is a sectional view of the portion of the apparatus in FIG. 31 and taken along line 32—32 of FIG. 31;

FIG. 33 is an enlarged fragmentary elevational view, partly in section, of an arrangement for supplying electrical current to resistance wires used in the apparatus of FIG. 24;

FIG. 34 is an end elevational view of a portion of the apparatus of FIG. 26 showing the relation between a dog and an actuating arm for a limit switch for controlling when current is applied to the electrical resistance wires of FIG. 33 and taken along line 34—34 of FIG. 26; and FIG. 35 is a sectional view of an orienting arrangement for a carrier of the apparatus of FIG. 25 and taken along line 35—35 of FIG. 25.

Figure 8:
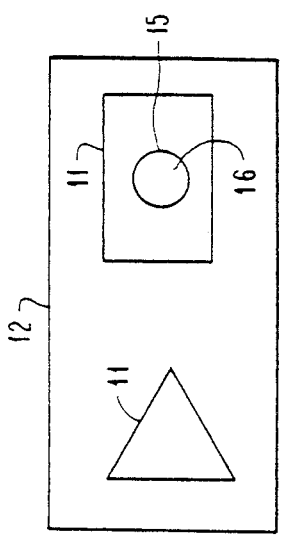
FIG. 8 is a top plan view of a cut segment of the composite sheet material and pieces cut therefrom.

Referring to FIG. 1, there is shown an apparatus 10 for cutting one or more pieces 11 (see FIG. 8) of various selected shapes from a segment or tile 12 of a composite assembly 14 (see FIG. 1). As shown in FIG. 8, one of the pieces 11 has a circular hole 15 cut therein when a scrap portion 16 is removed.

The apparatus 10 (see FIG. 1) preferably includes a rotatably mounted supply carrousel 17 having a plurality of independently rotatably mounted supply rolls 18 thereon. Each of the supply rolls 18 may have the composite assembly 14 of a different width, style, or material. It should be understood that only one of the supply rolls 18 is necessary but that the carrousel 17 is a more efficient operation.

The composite assembly 14 on each of the supply rolls 18 includes a composite sheet material 19 (see FIG. 29), which may be any type of composite material such as that described in U.S. Pat. No. 4,627,886 to Grone et al in which the fibers extend longitudinally, for example. The composite assembly 14 also includes a backing 20, which is formed of a material to which the composite sheet material 19 adheres. One suitable example of the backing 20 is a release paper sold by Akrosil, Menasha, WI as Silox release liner.

The composite assembly 14 on each of the supply rolls 18 (see FIG. 1) has a top cover film 21 (see FIG. 29) thereon to prevent the composite sheet material 19 on the supply roll 18 (see FIG. 1) from sticking to the opposite side of the backing 20 (see FIG. 29). One suitable example of the film 21 is polyethylene having a thickness of 0.002" to 0.004".

As shown in FIG. 1, each of the supply rolls 18 of the carrousel 17 has the film 21 of the composite assembly 14 on the supply roll 18 wrapped around a powered take-up roll 22 after passing over an idler roller 22'. Each of the supply rolls 18 has one of the take-up rolls 22 to pull the composite assembly 14 from the supply roll 18 and to remove the film 21 from the composite assembly 14 after the composite assembly 14 passes between an upper jaw 23 (see FIG. 17) and a lower jaw 24. Each set of the jaws 23 and 24 has cooperating powered feed rolls (not shown) to aid in pulling the composite assembly 14 (see FIG. 1) from the supply roll 18.

After removal of the film 21 (see FIG. 29), the remainder (the composite sheet material 19 and the backing 20) of the composite assembly 14 is advanced by having its end gripped by a gripper 25 (see FIG. 14), which is mounted on a first gantry 26. As shown in FIG. 16, the first gantry 26 is mounted for longitudinal sliding movement along a pair of parallel round support rails 27 (one shown) by having a pair of way bearings 27', which are mounted on the first gantry 26, sliding on each of the support rails 27. The first gantry 26 is powered by suitable means (not shown) under the control of a control system which includes an ACRAMATIC 975C CNC CONTROL sold by Cincinnati Milacron, Inc., the assignee of this application, and various selected computer programs.

The first gantry 26 includes a marking device, which is preferably an ink jet marker 28. The ink jet marker 28 is moved along parallel round ways 28' perpendicularly to the longitudinal movement of the first gantry 26.

The gripper 25 (see FIG. 15) grips the end of the remainder of the composite assembly 14 (see FIG. 17) after it has passed between the jaws 23 and 24 and the protective film 21 has been removed. The gripper 25 (see FIG. 15) pulls the remainder of the composite assembly 14 (see FIG. 1) past a cutter 29 and onto a porous conveyor belt 30. The cutter 29 is preferably a rotary cutter that moves transversely across the remainder of the composite assembly 14 when movement of the remainder of the composite assembly 14 is stopped after it is properly positioned.

The porous conveyor belt 30 is preferably formed of polyurethane with a fabric back. Both the polyurethane and the back are perforated throughout the width and the length with holes having a diameter of 1/16". The holes have their centers spaced one inch from each other in both the longitudinal and transverse directions.

The gripper 25 (see FIG. 15) includes a plurality of slidable jaws 31. There are preferably three modules of five of the jaws 31 each as shown in FIG. 15 for one of the modules.

Each of the jaws 31 of each of the modules has one end attached to a bar 32, which is reciprocated by an air cylinder 33 having its piston rod 34 connected to the bar 32 through a clevis 34A (see FIG. 16) and a bracket 34B. Each of the air cylinders 33 is supported on a plate 35 of the first gantry 26.

With this arrangement, only one, two, or three of the modules can have the jaws 31 reciprocate between extended and retracted positions at any time. This would depend upon the width of the composite sheet material 19 (see FIG. 29) and the backing 20 of the composite assembly 14 being cut.

Each of the jaws 31 (see FIG. 14) is slidably supported by a retainer 36. Each of the retainers 36 has a plurality of recesses 37 with each of the recesses 37 having one of the jaws 31 disposed therein. This maintains an upper surface 38 (see FIG. 17) of each of the jaws 31 in the same plane as the upper surface of the lower jaw 24.

When the powered take-up roll 22 (see FIG. 1) has advanced the remainder of the composite assembly 14 to the position of FIG. 17 by removing the film 21 therefrom, a pinch roller 39 (There is one of the pinch rollers 39 for each of the modules.) of one or more of the modules is moved downwardly to engage the composite sheet material 19 (see FIG. 29) of the composite assembly 14.

The pinch roller 39 (see FIG. 14) of each of the modules is rotatably supported by a shaft 40 in roller blocks 41, which are mounted on opposite ends of a carrier 42. The carrier 42 is connected to a piston rod 43 of an air cylinder 44. Thus, extension of the piston rod 43 moves the pinch roller 39 downwardly to engage the composite sheet material 19 (see FIG. 29) of the composite assembly 14.

The air cylinder 44 (see FIG. 14) is supported on a bracket 45, which is mounted on a support bracket 46.

The support bracket 46 is attached to a cross rail 47 of the first gantry 26.

At the same time that the pinch roller 39 is moved downwardly into engagement with the composite sheet material 19 (see FIG. 29) of the composite assembly 14 as shown in FIG. 18, brakes 48, which have rubber pads 48' bonded to their bottom surfaces, are moved into engagement with friction wheels 49, which are knurled rollers mounted on the ends of the shaft 40 extending through the roller blocks 41 as shown in FIG. 15. Thus, prevention of rotation of the friction wheels 49 will prevent rotation of the pinch roller 39.

The carrier 42 is slidably mounted on two vertical guide rods 50 (see FIG. 14), which are supported on the bracket 45 by guide blocks 51. This insures vertical motion of the pinch roller 39.

Each of the brakes 48 is attached to a piston rod 52 of an air cylinder 53, which is supported by the support bracket 46. Accordingly, the air cylinders 53 and the air cylinder 44 are activated at the same time. As shown in FIG. 14, the air cylinder 53 between two of the modules has the brake 48 cooperating with one of the friction wheels 49 of each of the two adjacent modules.

With the pinch roller 39 urging the backing 20 (see FIG. 29) of the composite assembly 14 (see FIG. 18) against the upper surface 38, which has a rubber friction pad 55 therein, of the jaw 31 to grip the composite sheet material 19 (see FIG. 29) and the backing 20 of the composite assembly 14, the first gantry 26 (see FIG. 16) is moved to the right in FIG. 18 to pull the desired length of the remainder of the composite assembly 14 past the cutter 29 (see FIG. 1) to produce the segment 12 of the desired length when the cutter 29 cuts the composite sheet material 19 (see FIG. 29) and the backing 20 of the composite assembly 14. After cutting of the composite assembly 14 to produce the segment 12 (see FIG. 1), the supply roll 18 and the powered take-up roll 22 are rotated in the opposite direction to retract the composite assembly 14 so that it does not extend beyond the end of the upper jaw 23 (see FIG. 17). This prevents any curling of the free end of the composite sheet material 19 (see FIG. 29) and the backing 20 of the composite assembly 14 that could occur if it were not retracted.

The upper jaw 23 (see FIG. 17) supports a flat spring 55A, which rests on raised buttons 55B on each side of the lower jaw 24 beyond the maximum width of the composite assembly 14. The flat spring 55A prevents the composite sheet material 19 (see FIG. 29) and the backing 20 of the composite assembly 14 from curling prior to being gripped by the gripper 25 (see FIG. 14).

After cutting of the segment 12 (see FIG. 1) by the cutter 29 has been completed, the extended jaws 31 (see FIG. 19) are withdrawn from supporting a portion of the segment 12 by retraction into the retainer 36 by activation of the air cylinder 33 (see FIG. 16) of one or more of the modules to retract the piston rod 34. This results in the segment 12 (see FIG. 19) falling onto the porous conveyor belt 30 as shown in FIG. 19.

The air cylinder 44 (see FIG. 14) is again activated to extend the piston rod 43 to cause the pinch roller 39 to engage the portion of the segment 12 (see FIG. 19) that was beyond where the composite sheet material 19 (see FIG. 29) and the backing 20 of the composite assembly 14 were gripped between the pinch roller 39 (see FIG. 18) and the rubber friction pad 55. The first gantry 26 (see FIG. 14) is moved to the right in FIG. 19 to cause the pinch roller 39 (see FIG. 19) to ride along the portion of the upper surface of the segment 12, which is resting on the porous conveyor belt 30.

As shown in FIG. 19, the maximum extension of the piston rod 52 is such that the brake 48 is substantially spaced from the friction wheel 49 when the pinch roller 39 is in engagement with the segment 12. As a result, the pinch roller 39 can roll along the segment 12 to roll out any creases in the segment 12.

Then, the first gantry 26 (see FIG. 14) returns the gripper 25 to the position in which the gripper 25 can grasp the ends of the composite sheet material 19 (see FIG. 29) and the backing 20 of the composite assembly 14 on the same supply roll 18 (see FIG. 1) or another of the supply rolls 18 after the ends have been advanced to the position of FIG. 17 by activation of the powered take-up roll 22 (see FIG. 1). During the movement of the first gantry 26 (see FIG. 14) to return the gripper 25 to the position in which the gripper 25 can grasp the ends of the composite sheet material 19 (see FIG. 29) and the backing 20 of the composite assembly 14, the porous conveyor belt 30 (see FIG. 1), which is powered by a motor 56 (see FIG. 27), is activated to move the segment 12 (see FIG. 1) thereon to the right to the position shown in FIG. 2.

The motor 56 (see FIG. 27) drives the porous conveyor belt 30 through a speed reducer 56' having a pulley 56A mounted on its shaft 56B and connected to a pulley 56C, which is secured to a shaft 56D of a roller 56E, by a toothed belt 56F. The roller 56E has an elastomeric cover such as rubber, for example, formed thereon for traction with the porous conveyor belt 30. A snub roller 57 is in contact with the outer surface of the porous conveyor belt 30 to provide sufficient wrap around the roller 56E for traction.

The porous conveyor belt 30 also passes around rollers 57A, 57B (see FIG. 28), and 57C. The roller 57C is longitudinally slidable to pretension the porous conveyor belt 30.

Each of the rollers 56E (see FIG. 27), 57A, 57B (see FIG. 28), and 57C has V grooves therein adjacent each end to receive V-shaped continuous ribs, which are bonded to each side of the inner surface of the porous conveyor belt 30. Accordingly, the porous conveyor belt 30 is endless, traction driven, and has its transverse position maintained.

After activation of the porous conveyor belt 30 (see FIG. 1) has moved the segment 12 thereon to the position shown in FIG. 2, the composite assembly 14 (see FIG. 1) on the supply roll 18 is pulled onto the porous conveyor belt 30 by the gripper 25 (see FIG. 14) through movement of the first gantry 26 (see FIG. 2) to the right in FIG. 2 until the second of the segments 12 to be cut extends the selected length past the cutter 29 (see FIG. 1). Then, the first gantry 26 is stopped, and the cutter 29 is activated.

After cutting of the second of the segments 12 is completed, the same steps occur with the first gantry 26 and the porous conveyor belt 30 as discussed with respect to the first of the segments 12. This disposes the second of the segments 12 adjacent the first of the segments 12 as shown in FIG. 2.

After all of the segments 12 are disposed on the porous conveyor belt 30 as shown in FIG. 3, the first gantry 26 is moved to dispose the ink jet marker 28 (see FIG. 16) over the first of the segments 12 (see FIG. 3) on the porous conveyor belt 30 as shown in FIG. 3. At this time, the first gantry 26 is moved longitudinally in cooperation with movement of the ink jet marker 28 (see FIG. 16) perpendicular to the longitudinal movement of the first gantry 26 to mark on the area of each of the segments 12 (see FIG. 8) from which each of the pieces 11 is to be cut. The marking can include the outline boundary of the piece 11 that is to be placed on one of the pieces 11 to be cut when the pieces 11 are later placed on top of each other in forming a composite part. The ink jet marker 28 (see FIG. 16) also marks any part number identification or other desired indicia on each of the areas of the first of the segments 12 (see FIG. 8) that is to have the piece 11 cut therefrom.

The ink jet marker 28 (see FIG. 16) is mounted on a mounting plate 58, which is slidably supported on the round ways 28'. Each of the ways 28' is attached to a rail 59 attached to the first gantry 26. The movement of the ink jet marker 28 along the round ways 28' orthogonal to the longitudinal movement of the first gantry 26 is by a motor (not shown).

The first gantry 26 (see FIG. 3) is then moved to the next of the segments 12 on the porous conveyor belt 30, and the marking process is repeated. This continues for each of the segments 12 on the porous conveyor belt 30. After all of the segments 12 on the porous conveyor belt 30 have been marked, the first gantry 26 is moved to the position of FIG. 4 at which it is parked.

Upon completion of marking of the segments 12 on the porous conveyor belt 30, the top of the composite sheet material 19 (see FIG. 29) of each of the segments 12 (see FIG. 4) is covered with a protective film 61. One suitable example of the protective film 61 is polyethylene having a thickness of 0.002" to 0.004".

The protective film 61 is supplied from a supply spool 62 (see FIG. 22), which is rotatably supported on a second gantry 63. The second gantry 63 is preferably powered but may be connected to a third gantry 64 (see FIG. 4), which is powered, so as to be a slave gantry, if desired. The second gantry 63 (see FIG. 22) is movable in the longitudinal direction by having a pair of way bearings 64A along each of the two parallel support rails 27 (one shown) so that the film 61 may be disposed over the top of each of the segments 12 (see FIG. 4) on the porous conveyor belt 30.

The film 61 (see FIG. 22) passes around a lower roller 64B on the second gantry 63 irrespective of the amount of the film 61 on the spool 62. As the amount of the film 61 on the spool 62 decreases, the film 61 also eventually passes around an upper roller 65 on the second gantry 63. The film 61 has its free end extending between pinch rolls 66 (see FIG. 23) and 66' to retain the film 61 (see FIG. 22).

The film 61 may be applied to the segments 12 (see FIG. 4) on the porous conveyor belt 30 by either a skid bar 67 (see FIG. 22) or a roller 68. The skid bar 67 has a rubber piece 67A bonded to a U-shaped metal piece 67B. The rubber piece 67A has a Teflon tape wrapped around its surface and overlying each leg of the U-shaped metal piece 67B. Retainer covers 67C overlie the portions of the Teflon tape and the legs of the U-shaped metal piece 67B. The covers 67C and the legs of the U-shaped metal piece 67B are secured to the skid bar 67 by screws 67D.

The roller 68 has its ends rotatably supported on a pair of L-shaped levers 69. Each of the L-shaped levers 69 is pivotally mounted by a shoulder screw 70 on the second gantry 63.

Each of the L-shaped levers 69 has one end pivotally connected to a piston rod 71 on a three position air cylinder 72 by a clevis 73. One of the L-shaped levers 69 is shown in FIG. 22 in its neutral position in which neither the skid bar 67 nor the roller 68 can dispose the film 61 over the top of each of the segments 12 (see FIG. 4) on the porous conveyor belt 30.

The skid bar 67 (see FIG. 22) is disposed within a vertical slot 73A of a skid bar guide 73B, which is fixed to the second gantry 63. Each end of the skid bar 67 has a pivot pin 73C retained therein by a set screw 73D.

Each of the pivot pins 73C is disposed within a slot 73E in one of the L-shaped levers 69 so that the skid bar 67 is moved downwardly when the piston rod 71 of each of the two air cylinders 72 is retracted. When each of the piston rods 71 is extended, the skid bar 67 is raised upwardly and the roller 68 is lowered to dispose the film 61 over the top of each of the segments 12 (see FIG. 4) on the porous conveyor belt 30.

Both the skid bar 67 (see FIG. 22) and the roller 68 are utilized because each functions better with different compositions of the composite sheet material 19 (see FIG. 30). The skid bar 67 (see FIG. 22) is used with most compositions of the composite sheet material 19 (see FIG. 30).

However, with some compositions of the composite sheet material 19, the leading edge of the segment 12 (see FIG. 4) has a tendency to curl upwardly from the porous conveyor belt 30. The roller 68 (see FIG. 22) prevents this through forming a traveling nip to force the leading edge of the segment 12 (see FIG. 4) downwardly upon the porous conveyor belt 30. This enables the roller 68 (see FIG. 22) to dispose the film 61 on top of the segment 12 (see FIG. 4) without folding over the leading edge of the segment 12.

After the second gantry 63 has been advanced sufficiently to cover the first of the segments 12 on the porous conveyor belt 30 with the film 61, each of the pieces 11 (see FIG. 8) is then cut from the first of the segments 12 (see FIG. 4) by a cutter 74 (see FIG. 20), which is supported on the third gantry 64 for movement orthogonal to the longitudinal movement of the third gantry 64. The third gantry 64 moves longitudinally through having a pair of way bearings 74' on each side riding along each of the two parallel round support rails 27 (one shown).

A vacuum is applied beneath the porous conveyor belt 30 (see FIG. 4) in the area of the porous conveyor belt 30 having the cut segments 12 thereon. The vacuum is supplied through a plurality of vacuum chambers 75 (see FIG. 27). Each of the vacuum chambers 75 is part of a vacuum table 75A, which has a porous top 75B supporting a porous sheet 75C beneath the bottom of the upper portion of the porous conveyor belt 30. The porous sheet 75C is preferably a sheet sold under the trademark POREX by Porex Technologies, Fairburn, Georgia with a thickness of ¼".

Each of the vacuum chambers 75 is connected to a manifold 75D (see FIG. 28) through piping 75E. The manifold 75D is connected through a conduit 75F to a vacuum source (not shown). A butterfly housing 75G is disposed in the pipine 75E between the manifold 75D and each of the vacuum chambers 75. Each of the butterfly housings 75G has a butterfly valve (not shown) therein movable between a closed position, an idle or intermediate (almost closed) position, and a full open position.

The manifold 75D has a vacuum capability of about one hundred inches of water. This is the vacuum applied when the butterfly valve is in its full open position. In its idle position, the butterfly valve is about 5% open.

Each of the butterfly housings 75G supports an air rotary actuator (not shown) through a bracket (not shown). One suitable example of the air rotary actuator is a Model 200 matryx vane type double action actuator sold by Xomox Corporation, Cincinnati, OH. The butterfly valve housing and the bracket also are sold by Xomox Corporation. The butterfly valve is a PLIAX-SEAL class 150 high performance butterfly valve. Any other suitable butterfly valve movable between full open and closed positions with a selected idle or intermediate position therebetween may be employed.

When in its idle position, the butterfly valve in the butterfly housing 75G allows a slight vacuum to be applied to the porous conveyor belt 30 through each of the vacuum chambers 75. All of the vacuum chambers 75 have their respective butterfly valves at the idle (almost closed) position when the apparatus 10 (see FIG. 1) is operating.

When the cutter 74 (see FIG. 20) is advanced to cut each of the segments 12 (see FIG. 4) on the porous conveyor belt 30 (see FIG. 27), the vacuum is increased in each of the vacuum chambers 75 beneath the portion of the porous conveyor belt 30 having the segment 12 (see FIG. 4), which is being cut. The vacuum is increased through moving the butterfly valve within the butterfly valve housing 75G (see FIG. 27) to its full open position. This is accomplished by movement of the vane type air actuator, which is connected to the butterfly valve within the butterfly valve housing 75G, through energizing a proximity switch (not shown), which is supported adjacent one of the rails 27 to allow supply of compressed air to the vane type air actuator to move the butterfly valve within the butterfly housing 75G to its full open position. The proximity switch is energized by a metal strip, for example, on the third gantry 64 (see FIG. 20) on which the cutter 74 is mounted.

When cutting of the segment 12 (see FIG. 4) is no longer occurring over one of the vacuum chambers 75 (see FIG. 27) as determined by the position of the third gantry 64 (see FIG. 20), the butterfly valve in the butterfly valve housing 75G (see FIG. 27) for the specific vacuum chamber 75 is moved to its idle (almost closed) position in which a slight amount of vacuum is applied. Then, at least the next of the vacuum chambers 75 has full vacuum applied thereto due to the position of the third gantry 64 (see FIG. 20) as it advances the cutter 74 to the left in FIG. 4.

The cutter 74 (see FIG. 9) includes a housing 76, which is supported on the third gantry 64 (see FIG. 20) for orthogonal movement relative to the longitudinal movement of the third gantry 64. The housing 76 of the cutter 74 is attached to a horizontal bottom plate 77 of an L-shaped bracket 78 by screws 78' (see FIG. 9).

The L-shaped bracket 78 (see FIG. 20) has a vertical plate 79 with a triangular shaped brace 80 extending between the vertical plate 79 and the horizontal bottom plate 77. The vertical plate 79 of the L-shaped bracket 78 is secured to a mounting plate 81 by screws 82.

The mounting plate 81 has an anchor bracket 83 secured thereto to provide an anchor for the upper end of a piston rod 84 of an air cylinder 85. The lower end of the air cylinder 85 is attached to a bracket 86, which is secured to a mounting plate 87. The mounting plate 87 is slidably mounted by two pairs of pillow blocks 87' sliding on each of two parallel round ways 88, which are supported on the third gantry 64 by supports 89.

The mounting plate 87 has two parallel vertical round ways 90 (see FIG. 21) mounted thereon by supports 91, which are attached by screws 92 to the mounting plate 87. The mounting plate 81 has two pairs of vertically spaced pillow blocks 93 secured thereto by screws 94. The pillow blocks 93 receive the round ways 90 therein so that the mounting plate 81 and the attached cutter 74 (see FIG. 20) are vertically movable on the vertical round ways 90.

Downward movement of the mounting plate 81 by supplying air to the air cylinder 85 to move the piston rod 84 downwardly is stopped by two buttons 95 (one shown in FIG. 20) on the bottom of the mounting plate 81 engaging two adjustable screws 96 (see FIG. 21). Each of the adjustable screws 96 (see FIG. 20) is adjustably mounted in its support body 97 and secured with a locknut 96a. Each of the support bodies 97 is fixed to the bottom of one of the vertical round ways 90. Therefore, the cutter 74 is properly positioned in a vertical direction with respect to the segment 12 (see FIG. 4), which is to be cut. This adjustment of each of the adjustable screws 96 (see FIG. 20) is accomplished before starting operation.

The housing 76 (see FIG. 9) includes a lower part 107 and an upper part 108. Screws 109 secure the lower part 107 and the upper part 108 to each other.

A cam rotor 111 is rotatably supported within the upper part 108 of the housing 76 of the cutter 74 by bearings 112 and 112'. The cam rotor 111 includes an upper cam rotor 113 and a lower cam ring 114 spaced from the upper cam rotor 113 by a ring 115, the bearing 112, and a spacer 115'. The upper cam rotor 113, the lower cam ring 114, the ring 115, and the spacer 115' are secured to each other by screws 116. The upper cam rotor 113 and the lower cam ring 114 are held in a precise angular relationship by a pin 117.

The upper cam rotor 113 has a downwardly facing cam surface 118 on its lower portion. The cam surface 118 is a two lobe sinusoidal face cam with its high points 180° from each other.

The lower cam ring 114 has an upwardly facing cam surface 119 on its upper portion. The cam surface 119 is a two lobe face cam with its lobes being 90° out of phase with the lobes of the cam surface 118 on the upper cam rotor 113 and its high points are 180° from each other.

The cam rotor 111 is rotated in a single direction at a relatively high rate of speed by a motor 120 (see FIG. 20), which is supported on a block (not shown) extending upwardly from the bottom plate 77 of the L-shaped bracket 78 on which it is mounted. The motor 120 has its shaft (not shown) extend into a chamber within the block with a pulley (not shown) mounted thereon. The pulley is connected by a belt 123 (see FIG. 9), which extends through an opening in the block, to a pulley 124 on the upper cam rotor 113 of the cam rotor 111. This produces the high speed of the cam rotor 111.

The cutter 74 has a pair of reciprocating knife blades 132 and 133 disposed within a recess 134 in a tool holder 135. The knife blades 132 and 133 are always reciprocated in opposite directions so that the accelerating forces on the knife blades 132 and 133 and their driving mechanisms are in opposite directions and equal in magnitude. This eliminates the main source of vibration of the knife blades 132 and 133 and their driving mechanisms.

The knife blade 132 is rigidly attached to the tool holder 135 by a pair of cross pins 136. A hollow guide tube 137 surrounds the upper portion of the tool holder 135. The guide tube 137 has a tang 138 extending into a circumferential recess 139 (see FIG. 10) in the tool holder 135 to provide a reciprocating driving connection therebetween. Thus, as the guide tube 137 (see FIG. 9) is reciprocated, the tool holder 135 and the knife blade 132 are reciprocated therewith.

Figure 12:
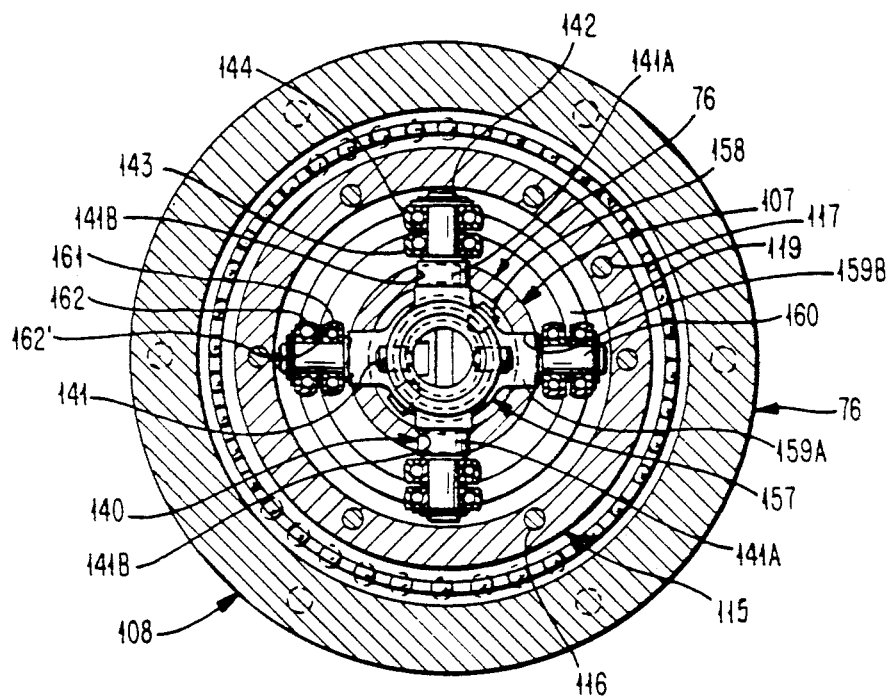
FIG. 12 is a cross sectional view of the cutter of FIG. 9 showing the relationship between the various bearings on drivers for the knife blades and taken along line 12—12 of FIG. 9, with Oldham coupling 163 removed.

The upper end of the guide tube 137 is connected to a T-shaped inner driver 140. The inner driver 140 is secured by diametrically disposed set screws 141 to the guide tube 137. The inner driver 140 has a pair of oppositely disposed portions 141A (see FIG. 12) resting in key slots 141B in the upper end of the lower part 107 of the housing 76.

Figure 10:
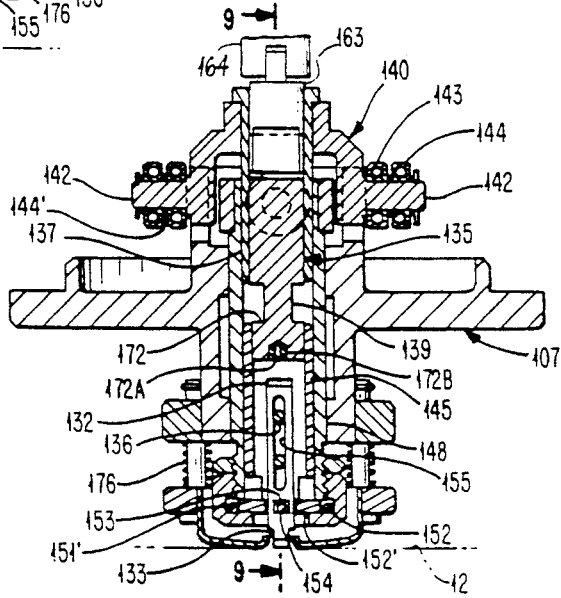
FIG. 10 is a longitudinal sectional view of the cutter of FIG. 9 and taken along line 10—10 of FIG. 9 with some portions of FIG. 9 omitted.

The inner driver 140 includes a pair of oppositely disposed cylindrical studs 142 extending from the portions 141A with each of the studs 142 having an inner bearing 143 and an outer bearing 144 thereon separated from each other by a spacer 144' (see FIG. 10). Each of the inner bearings 143 rides on the cam surface 118 (see FIG. 9) of the upper cam rotor 113, and each of the outer bearings 144 (see FIG. 10) rides on the cam surface 119 (see FIG. 9) of the lower cam ring 114. The bearing 112, the ring 115, and the spacer 115' separate the cam surfaces 118 and 119 by an amount equal to the outer diameter of each of the inner bearings 143 (see FIG. 10) and the outer bearings 144.

During 90° rotation of the cam rotor 111 (see FIG. 9), the cam surface 118 drives the knife blade 132 downwardly to produce cutting of the composite sheet material 19 (see FIG. 29) and the backing 20 by the knife blade 132 (see FIG. 9). The cam surface 119 on the lower cam ring 114 lifts the guide tube 137 to retract the knife blade 132 during the next 90° of rotation of the cam rotor 111. Thus, during each 360° of rotation of the cam rotor 111, there are two cutting cycles of the knife blade 132.

The tool holder 135 has its lower portion surrounded by a tube 145, which is the same outer diameter as the guide tube 137. The tube 145 has the cross pins 136 extending into holes in the tube 145 and the tool holder 135 to connect the tube 145 to the tool holder 135. Set screws 147 are threaded into the tool holder 135 to move the knife blade 132 to take up the lateral clearance between the knife blades 132 and 133.

A guide tube 148 surrounds the tube 145 and the tube 137 and is slidable relative thereto. The lower end of the guide tube 148 is threaded to receive a lock nut 149 and an end cap 150.

The end cap 150 has an opening 151 through which the knife blades 132 and 133 extend. The end cap 150 has a groove 151' to receive a ring 152, which centers a driver disc 152' on its outer surface. The end cap 150 holds the driver disc 152' against the bottom end of the guide tube 148.

Figure 11:
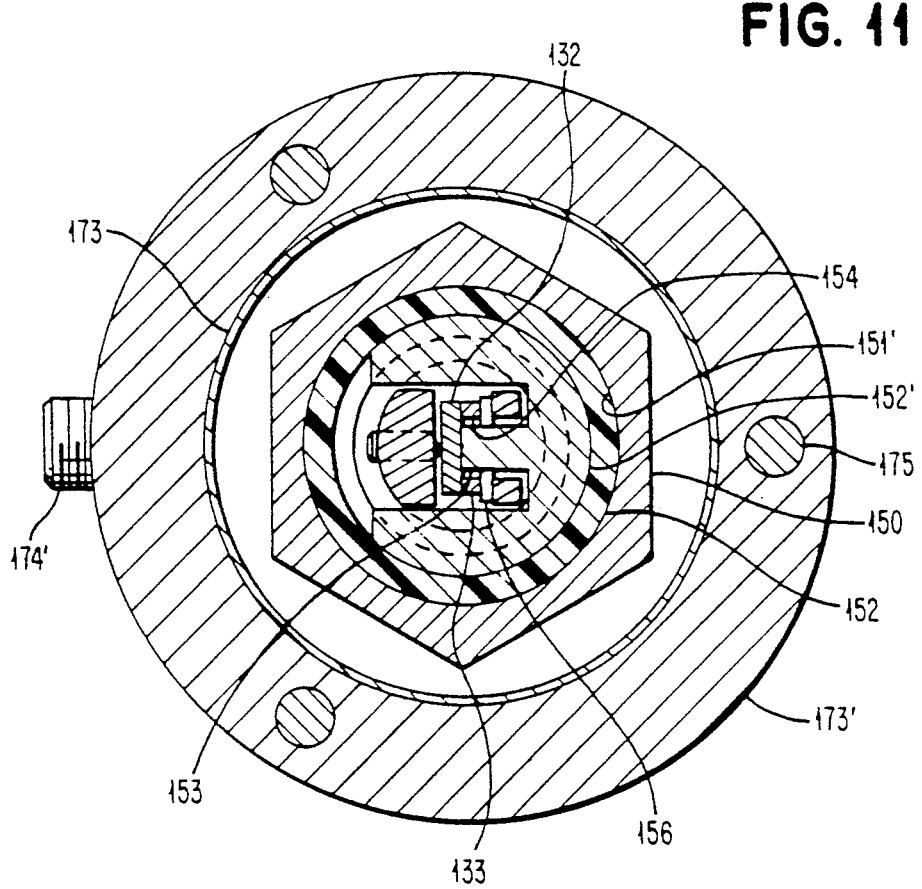
FIG. 11 is an enlarged cross sectional view of the lower portion of the cutter of FIG. 9 showing the connection of one of the knife blades of the cutter to a driver disc and taken along line 11—11 of FIG. 9.

As shown in FIG. 11, the driver disc 152' has a key 153 fitting into a square-shaped slot 154 (see FIG. 10) in the knife blade 133. This provides a tight fit between the knife blade 133 and the key 153 in the vertical direction but not in the horizontal direction as shown in FIG. 11. The tight fit is required in the vertical direction to prevent lost motion when the knife blade 133 is reciprocated.

The knife blade 133 has a longitudinal slot 155 (see FIG. 10) to receive the two cross pins 136. Therefore, the knife blade 133 can reciprocate relative to the knife blade 132 and the tool holder 135 without engaging either of the cross pins 136.

A wear strip 156 (see FIG. 9) is disposed between the knife blade 133 and a wall of the recess 134 in the tool holder 135 to prevent wear of the wall of the recess 134. One suitable example of the wear strip 156 is OILITE bronze.

The guide tube 148 is attached to an outer driver 157 by diametrically disposed set screws 158 (see FIG. 12) engaging a reduced upper end 159 (see FIG. 9) of the guide tube 148. The outer driver 157 has a pair of oppositely disposed portions 159A (see FIG. 12) in key slots 159B in the upper end of the lower part 107 of the housing 76.

The outer driver 157 has a pair of oppositely disposed cylindrical studs 160 extending from the portions 159A. Each of the studs 160 has an inner bearing 161 and an outer bearing 162 mounted thereon and separated from each other by a spacer 162'. Each of the inner bearings 161 rides on the downwardly facing cam surface 118 (see FIG. 9) of the upper cam rotor 113, and each of the outer bearings 162 rides on the upwardly facing cam surface 119 of the lower cam ring 114.

Each of the inner bearings 161 and the outer bearings 162 has the same outer diameter as each of the inner bearings 143 (see FIG. 10) and the outer bearings 144. The studs 160 (see FIG. 12) of the outer driver 157 are disposed perpendicular to the studs 142 of the inner driver 140. Thus, the direction of reciprocation of the knife blade 133 (see FIG. 9) is always opposite to that of the knife blade 132.

The upper end of the tool holder 135 is connected through an Oldham coupling 163 to a steering shaft 164, which is rotatably supported within the cam rotor 111 by bearings 165. The steering shaft 164 is connected to a rotary indexing motor 166, which is supported on a block 166' attached to the horizontal bottom plate 77 of the L-shaped bracket 78 by the screws 78'. Thus, energization of the motor 166 enables rotation in either direction of the tool holder 135 to rotate the knife blades 132 and 133 relative to the composite sheet material 19 (see FIG. 29) that is being cut by reciprocation of the knife blades 132 (see FIG. 9) and 133 of the cutter 74.

The tool holder 135 is removable from the housing 76 through removing the end cap 150 from the guide tube 148 and then rotating the tool holder 135 until a longitudinal key slot 167 in the tool holder 135 aligns with the tang 138 on the guide tube 137. Removal of the tool holder 135 enables replacement of either of the knife blades 132 and 133.

Pressurized air is supplied from a source through a conduit 168 to an annular chamber 169 (see FIG. 13) within the lower part 107 of the housing 76 (see FIG. 9). The air flows from the annular chamber 169 (see FIG. 13) through three passages 170 in the guide tube 148 to the interior of the guide tube 148. The tool holder 135 has three passages 171 extending from a bottom wall 172 (see FIG. 9) of the recess 139 (see FIG. 10) in the tool holder 135 to the recess 134 (see FIG. 9) in the tool holder 135 through a passage 172A (see FIG. 10) in a plug 172B at the top of the recess 134 (see FIG. 9) in the tool holder 135. This enables the pressurized air to flow into the recess 134 to cool the reciprocating blades 132 and 133.

The cutter 74 also has a hold down foot 173 for engaging the segment 12 (see FIG. 4) on the porous conveyor belt 30 when it is to be cut by the cutter 74 (see FIG. 9). The hold down foot 173 is attached to a collar 173' by suitable means such as an adhesive or being press fitted, for example.

The collar 173' is resiliently supported from a mounting ring 174, which is retained on the lower part 107 of the housing 76 by a set screw 174', by three guide pins 175, which have a snug fit with the collar 173'. Each of the guide pins 175 is surrounded by a spring 176, which acts between the collar 173' and the mounting ring 174 to apply a resilient force to the hold down foot 173. A retaining ring 176' on each of the guide pins 175 limits the movement of the hold down foot 173 by the springs 176.

After all of the pieces 11 (see FIG. 8) have been cut from the segments 12 on the porous conveyor belt 30 (see FIG. 4), the porous conveyor belt 30 is activated along with an auxiliary conveyor 177 (see FIG. 27) and the pinch rolls 66 (see FIG. 23) and 66' to move each of the segments 12 (see FIG. 8), which include the pieces 11, to the right in FIGS. 5 and 23. A metal piece 177A (see FIG. 27) has a portion 177B disposed between the end of the porous conveyor belt 30 and the start of the auxiliary conveyor 177, which is preferably metal. The metal piece 177A is mounted on each side of the auxiliary conveyor 177 so as to be substantially U-shaped when viewed from above.

A motor (not shown) drives the pinch roll 66 (see FIG. 23). The pinch roll 66 is connected to a drive roller 178 for the auxiliary conveyor 177 through a first belt to an idle roller (not shown), which is connected by a second belt to the drive roller 178. It should be understood that the motor for the pinch roll 66 is not activated when the porous conveyor belt 30 (see FIG. 4) is being driven to position the segments 12 with respect to the third gantry 64, which has the cutter 74 (see FIG. 20) thereon, so that there would be no motion of the auxiliary conveyor 177 (see FIG. 23) or the pinch roll 66.

At the time of completion of cutting the pieces 11 (see FIG. 8) from the segments 12, the third gantry 64 (see FIG. 5) is moved to the right as far as possible prior to activation of the porous conveyor belt 30. The second gantry 63 is either locked to the porous conveyor belt 30 for movement therewith through disposing a lock pin 179 (see FIG. 22) on the second gantry 63 into one of a plurality of openings 179A in the porous conveyor belt 30 by activating an air cylinder 179B or moving the second gantry 63 by its motor (not shown) at the same rate as the porous conveyor belt 30 moves the segments 12 (see FIG. 8), which include the pieces 11, to the right in FIG. 5. Advancement of the segments 12 to the right in FIG. 5 from the porous conveyor belt 30 to the auxiliary conveyor 177 (see FIG. 27) is produced by the protective film 61 (see FIG. 23) passing between the pinch roll 66, which is driven at the same rate as the porous conveyor belt 30 (see FIG. 5), and the pinch roll 66' (see FIG. 23) prior to the film 61, which includes the portion of the segments 12 (see FIG. 8) not having the pieces 11 and constituting scrap, being collected on a conveyor 179C (see FIG. 5).

Each of the segments 12 (see FIG. 23) passes through separating means 180 during advancement of the segments 12 from the auxiliary conveyor 177 by the film 61 passing through the pinch rolls 66 and 66'. The separating means 180 separates the pieces 11 from the segments 12 so that the portion of each of the segments 12 not having the piece or pieces 11 is diverted between the pinch rolls 66 and 66' with the film 61. The pieces 11 (see FIG. 8) in each of the segments 12 are caused to continue to the right in FIG. 23.

When the segment 12 with the piece or pieces 11 moves to the right from the auxiliary conveyor 177, it passes over a brush 181 of the separating means 180. The brush 181, which extends for the width of the auxiliary conveyor 177, separates the piece or pieces 11 from each of the segments 12 so that each of the pieces 11 continues to travel in a substantially horizontal plane while the remainder of the segment 12 constituting the scrap passes around a separating roller 182 prior to passing between the pinch rolls 66 and 66'.

The brush 181 is disposed in a holder 182A, which is secured to a metal bracket 182B. The metal bracket 182B is mounted on the metal piece 177A (see FIG. 27) and extends for the width of the auxiliary conveyor 177. The metal bracket 182B (see FIG. 23) also supports a transfer element 182C, which is formed of a suitable plastic such as Delrin, for example, for supporting each of the segments 12 when it is advanced from the auxiliary conveyor 177.

The separating means 180 includes a housing 183 having a plurality of brushes 184 movable into a space beyond the separating roller 182 as shown in phantom to aid in directing the scrap. The number of the brushes 184 is dependent upon the width of the auxiliary conveyor 177, which is the same width as the porous conveyor belt 30 (see FIG. 27). Since the width of each of the segments 12 (see FIG. 8) can be less than the width of the porous conveyor belt 30 (see FIG. 27) and the auxiliary conveyor 177, the maximum number of the brushes 184 (see FIG. 23) to be activated is dependent upon the width of the segment 12. Furthermore, only the brushes 184 that are over the portions of the segment 12 not having the piece 11 therein are activated.

Each of the brushes 184 is normally held in a retracted or inactive position by a spring 186. The spring 186 continuously urges a pivotally mounted finger 187, which has the brush 184 mounted thereon, counterclockwise about a pivot pin 188 supported by the housing 183.

When the brush 184 is to be moved to its material diverting position as shown in phantom, an air cylinder 189, which is supported on the housing 183 by a bracket 190, is activated to move its piston rod 191 to the right. There are preferably thirty-one of the air cylinders 189 with the centers of the air cylinders 189 being disposed one inch from each other when the width of each of the porous conveyor belt 30 (see FIG. 27) and the auxiliary conveyor 177 is thirty inches.

A cylindrical element 192 (see FIG. 23), which is secured to the piston rod 191 of the air cylinder 189, has a cam surface 193 on its end for engaging the upper end of a vertically disposed plunger 194. The cylindrical element 192 is slidably supported within the housing 183 so that it can only move horizontally, and the plunger 194 is slidably supported within the housing 183 so that it can only move vertically. Therefore, when the cylindrical element 192 moves to the right, the plunger 194 is moved downwardly and engages a plunger 195 on the finger 187 to move the finger 187 clockwise against the force of the spring 186. This moves the brush 184 to its material diverting position as shown in phantom.

The plunger 195 is continuously urged out of the finger 187 by a spring 196. This insures that any overtravel of the cylindrical element 192 to cause further downward motion of the plunger 194 will be compensated by compression of the spring 196. A set screw 196' retains the spring 196 against the plunger 195.

When the finger 187 moves the brush 184 to its material diverting position, a roller 197, which is rotatably supported on the finger 187, is moved into engagement with the top of each of the segments 12 and urges the bottom of each of the segments 12 thereof against the roller 182. The roller 182 causes most of the scrap of each of the segments 12 to follow the feed of the film 61 between the pinch rolls 66 and 66'. The roller 197 prevents the rear end of the short scrap portion 16 (see FIG. 8) from popping up as the scrap of the segment 12 (see FIG. 23) passes around the roller 182. If the rear end of the relatively short scrap portion 16 (see FIG. 8) were to pop up, then the scrap portion 16 might not be advanced in the desired vertical direction.

The brushes 184 (see FIG. 23), which are to be activated, may be activated at different times during the passage of each of the segments 12 (see FIG. 8) and the pieces 11. For example, if one of the pieces 11 has a rectangular shape with the circular hole 15 cut therein, one of the brushes 184 (see FIG. 23) would be activated at the leading edge of the scrap portion 16 (see FIG. 8) forming the hole 15 in the piece 11. Then, other of the brushes 184 (see FIG. 23) are activated as the piece 11 is advanced to the right in FIG. 23 to have the brushes 184 acting on the scrap portion 16 (see FIG. 8) to be removed from the piece 11 to form the hole 15 therein. As the diameter of the hole 15 decreases, the number of the activated brushes 184 (see FIG. 23) will decrease. Additionally, at the end of the piece 11, all of the brushes 184 extending across the width of the piece 11 are activated to insure that the portion of the segment 12 forming the scrap does not continue with the piece 11.

As each of the pieces 11 is separated by the separating means 180 from the remainder of the segment 12 that becomes scrap, the piece 11 is advanced to be disposed on top of a bottom film 198, which is preferably polyethylene having a thickness of 0.002" to 0.004". The bottom film 198 is supplied from a rotatably mounted supply spool 199 around a drive roller 200.

The drive roller 200 is driven at the same rate as the pinch roll 66 through being connected to the pinch roll 66 by a belt and pulleys on the pinch roll 66, the drive roller 200, and an idle roller (not shown). Thus, whenever there is advancement of the pieces 11 beyond the separating means 180 and over a metal part 201, the drive roller 200 is being driven to pull the bottom film 198 from the supply spool 199.

The metal part 201 is employed to support the piece 11 in its advancement to the bottom film 198 if the piece 11 were to curl down or droop down because of the piece 11 being too flexible. The metal part 201 also aids in guiding the scrap of each of the segments 12 passing between the pinch rolls 66 and 66' when the scrap of the segment 12 is so stiff as not to bend around the roller 182 to pass between the pinch rolls 66 and 66'. The metal part 201 also prevents the scrap of the segment 12, if it were so stiff as to not bend around the roller 182 to pass between the pinch rolls 66 and 66', from sticking to the bottom film 198.

The bottom film 198 extends from the drive roller 200 over a roller 202 (see FIG. 24), which is supported by a pair of substantially parallel side support plates 203 (see FIG. 25) and 204. The side support plates 203 and 204 also support the drive roller 200 (see FIG. 23) and the metal part 201.

The bottom film 198 supports the pieces 11 (see FIG. 30) as they are advanced from the separating means 180

(see FIG. 23). The bottom film 198 also will prevent the pieces 11 (see FIG. 30) from sticking together when the bottom film 198 and the pieces 11 are wrapped around a first roller 205 (see FIG. 5), which is rotatably supported on a carrier 206 (see FIG. 24).

The carrier 206 includes a pair of parallel arms 207 (see FIG. 25) rotatably supporting opposite ends of the first roller 205. The opposite ends of the arms 207 rotatably support a second roller 208. The arms 207 of the carrier 206 are fixed to a shaft 209, which is rotatably supported by OILITE bushings 209A (see FIG. 33) in plates 209B attached to the side support plates 203 and 204. Each of the arms 207 has a sleeve 209C fixed thereto by screws 209D with the sleeve 209C being connected to the shaft 209 by a pin 209E.

Each of the rollers 205 (see FIG. 25) and 208, which are cardboard, has its opposite ends supported on a tapered serrated holder 210. Each of the holders 210 is slidably mounted on a shaft 211 and is resiliently biased towards engagement with the roller 205 or 208 by a spring 212 (see FIG. 26) surrounding the shaft 211, which is rotatably mounted by bearings 213 within a housing 214. Each of the housings 214 is slidably mounted within a block 215 fixed to an end of one of the arms 207 (see FIG. 25) of the carrier 206.

Each of the holders 210 is retracted when the first roller 205 or the second roller 208 mounted thereon is filled and is to be replaced by an empty roller. To remove the first roller 205 from the holders 210, a pair of air cylinders 216, which are supported by the side support plates 203 and 204, have their piston rods 217 advanced. The advancement of the piston rod 217 of each of the air cylinders 216 causes a tapered surface 218 (see FIG. 31) of a dog 219, which is attached to the end of the piston rod 217 and prevented from rotating by a guide block 219' on the side support plate 203 or 204 (see FIG. 25), to engage an unlock plate 220 (see FIG. 32), which is secured to a latch 221. This moves the latch 221, which is spring loaded by a spring 222 (see FIG. 31) and pivotally supported by a pivot pin 223 on one of the arms 207, so that the latch 221 is moved off a self-locking tapered surface 224 of a shifter fork 225.

The shifter fork 225 (see FIG. 32) is pivotally mounted by one of the arms 207 through a pivot pin 226 extending through a pair of blocks 227 on the arm 207. Each of the shifter forks 225 has a pair of diametrically disposed pins 228 (see FIG. 26) extending from its fingers 229 and connected to the housing 214.

This removal of the latch 221 (see FIG. 31) from the self-locking surface 224 of the shifter fork 225 allows the cylinder 216 (see FIG. 25) to have a pusher 230 on the end of its piston rod 217 continue to advance the shifter fork 225 so that it rotates clockwise (as viewed in FIG. 25) for the lowermost of the two shifter forks 225 supporting the first roller 205 about the pivot pin 226. This motion of the shifter fork 225 retracts the housing 214 to pull the holder 210 out of one end of the first roller 205. A similar operation is occurring at the other end of the first roller 205 except that the shifter fork 225 rotates counterclockwise.

When the first roller 205 is replaced and another empty cardboard roller is disposed in its place, the piston rod 217 of each of the air cylinders 216 is retracted while a piston rod 231 of each of a pair of cylinders 232 is advanced. This pivots each of the shifter forks 225 in the opposite direction through a pusher 233 on the end of the piston rod 231 engaging the shifter fork 225 so that the holders 210 are moved into the open ends of the empty cardboard roller. Each of the shifter forks 225 continues to be advanced until it engages a stop 234 on the arm 207 on which the shifter fork 225 is pivotally mounted by the pivot pin 226.

Compensation for any variation in the length of the empty cardboard roller is made through compression of the spring 212 (see FIG. 26) acting on the holder 210. The serrations on the holder 210 are forced into the inner surface of the cardboard roller so that it will rotate when the holders 210 are driven.

It should be understood that the stop 234 (see FIG. 25) is adjustable initially within the arm 207 in which it is mounted. The position of the stop 234 is such that the spring loaded latch 221 (see FIG. 31) can return to the position in which it engages the self-locking tapered surface 224 of the shifter fork 225.

After the shifter fork 225 has engaged the stop 234 (see FIG. 25), the piston rod 231 of the air cylinder 232 is retracted. The shifter fork 225 remains engaged with the stop 234 because of the spring loaded latch 221 (see FIG. 31) engaging the self-locking tapered surface 224 of the shifter fork 225.

When the first roller 205 (see FIG. 25) is in the nine o'clock position of FIG. 5, the first roller 205 (see FIG. 25) is driven from a motor 237, which is selectively connected to the first roller 205 by connecting means 238. The connecting means 238 may include a stud 239 reciprocated by an air cylinder 240 between an engaging position with the first roller 205 and a non-engaging position.

The motor 237 only drives the first roller 205 when the first roller 205 is in the nine o'clock position of FIG. 5 on the carrier 206 (see FIG. 25) at which the first roller 205 has the bottom film 198 (see FIG. 30) and the pieces 11 wrapped therearound. The motor 237 (see FIG. 25) is driven at a rate to keep up with the bottom film 198 (see FIG. 30) coming from the drive roller 200 (see FIG. 23).

At start up, the bottom film 198 (see FIG. 24) is initially manually wrapped around the first roller 205 on the carrier 206 with the first roller 205 in the nine o'clock position of FIG. 5. When the first roller 205 has the desired number of the pieces 11 (see FIG. 30) on the bottom film 198 wrapped therearound, the carrier 206 (see FIG. 24) is rotated 180° counterclockwise in FIG. 24 by activation of a motor 241 (see FIG. 25), which is connected to the shaft 209. This exchanges the positions of the first roller 205 and the second roller 208 so that the second roller 208 is at the nine o'clock position in FIG. 6 to receive the pieces 11 (see FIG. 30).

At the end of each 180° rotation by the motor 241 (see FIG. 25), the carrier 206 is oriented so that the shaft 211 for one of the holders 210 is aligned with the stud 239 of the connecting means 238. This is accomplished through a resiliently biased orienting plunger 242 (see FIG. 35), which is slidably disposed within a support block 243 secured to the side support plate 203, cooperating with one of two blocks 244 on one of the arms 207 of the carrier 206 (see FIG. 25). The two blocks 244 (see FIG. 35) are horizontally aligned with each other on the arm 207 so that they are 180° from each other.

A spring 245, which is disposed within the support block 243, continuously urges the plunger 242, which is mounted on one end of a shaft 246, out of the support block 243. This movement is limited by a knob 247 on the shaft 246 engaging the support block 243.

Each of the blocks 244 has a tapered surface 248 engaging a tapered surface 249 on the plunger 242 when the motor 241 (see FIG. 25) rotates the carrier 206. After the tapered surface 248 (see FIG. 35) on one of the two blocks 244 engages the tapered surface 249 of the plunger 242 to move it inwardly against the force of the spring 245 so that the block 244 can move past the plunger 242, the motor 241 (see FIG. 25) is stopped. Then, the motor 241 is reversed until a flat surface 250 (see FIG. 35) on the plunger 242 engages a flat surface 251 on the block 244.

The shaft 246 has a pin 251A riding in a slot 251B in the support block 243. This maintains the plunger 242 with the tapered surface 249 always oriented to engage the tapered surface 248 of one of the blocks 244 on the arm 207 during rotation of the carrier 206.

Thus, the plunger 242 orients the carrier 206 (see FIG. 25) each time that rotation of the carrier 206 by the motor 241 is completed so that the shaft 211 for one of the holders 210 is aligned with the stud 239 of the connecting means 238. This is necessary to enable rotation of the roller 205 or 208 at the nine o'clock position of FIG. 5.

With the first roller 205 (see FIG. 24), which is at the three o'clock position in FIGS. 6 and 24, having the bottom film 198 connected thereto from the supply spool 199 (see FIG. 23), the bottom film 198 is automatically wrapped around the second roller 208 (see FIG. 24) by activation of wrapper arm means 252. Rotation of the wrapper arm means 252 causes cutting of the bottom film 198 by moving the bottom film 198, which is extending from the first roller 205, to engage a first electrical resistance wire 253 extending between an electrically insulating block 254 (see FIG. 33) on one of the arms 207 and an electrically insulating block 255 on the other of the arms 207. A second electrical resistance wire 256 extends between an electrically insulating block 257 on the arm 207 having the block 254 and an electrically insulating block 258 on the arm 207 having the block 255. An insulated electrical wire 259 connects the wires 253 and 256 to each other adjacent their connections to the blocks 255 and 258, respectively, to connect the ends of the wires 253 and 256 to each other.

The electrically insulating block 254 has a metal conductive block 260 mounted thereon and connected by an insulated electrical wire 261 to the electrical resistance wire 253. A plunger 262 is continuously urged into engagement with the conductive block 260 by a spring 263, which is supported within an electrically insulated housing 264. The housing 264 is mounted on the side support plate 204. The plunger 262 has a pair of nuts 264A and 264B thereon to receive a wire lug. The conductive block 260 has a tapered surface (not shown) to move the plunger 262 against the force of the spring 263 when the carrier 206 (see FIG. 24) rotates from one of its two positions to the other.

The wire 256 (see FIG. 33) is similarly connected so that a continuous electrical circuit is formed through the wires 253 and 256 when a limit switch 265 is closed (see FIG. 26). The limit switch 265 is closed when the wrapper arm means 252 (see FIG. 24) is moved from its inactive position towards the second roller 208.

The wrapper arm means 252 includes a pair of arms 266 and 267 (see FIG. 26) mounted on a shaft 268, which is rotatably supported by sleeves 268A attached to the side support plates 203 and 204 by screws 268B. The ends of the arms 266 and 267 have a support plate 269 connected thereto and extending therebeyond to rotatably support a plurality of rollers 270 thereon.

A motor 271, which is supported by the side support plate 203, rotates the wrapper arm means 252 by driving the shaft 268, which has one end protruding slightly beyond the side support plate 204 through a retaining ring 271' in a groove in the shaft 268 engaging the sleeve 268A on the side support plate 204. As the motor 271 rotates the shaft 268, a dog 272, which is mounted on the protruding end of the shaft 268 by a screw 272A passing through a washer 272B, engages a roller 273 on the end of a pivotally mounted arm 274 of the limit switch 265 to close the limit switch 265. This causes energization of both of the wires 253 (see FIG. 24) and 256 so that the wire 253 will be hot enough to melt the bottom film 198 by the time that the rollers 270 of the wrapper arm means 252 engage the bottom film 198, which is wrapped around the first roller 205, to cause the bottom film 198, as shown in phantom, to engage the wire 253 to cut the bottom film 198.

The current to the wires 253 and 256 is stopped as the rollers 270 on the wrapper arm means 252 are about to engage the second roller 208. Deenergization of the wires 253 and 256 occurs because the dog 272 (see FIG. 34) no longer engages the roller 273 on the end of the arm 274 of the limit switch 265 so that the arm 274, which is resiliently urged to its initial open position (solid line position of FIG. 34), returns to its initial open position to interrupt the current to the wires 253 (see FIG. 24) and 256.

As shown in FIG. 34, the dog 272 has a first inclined surface 275 engaging the roller 273 to pivot the arm 274 counterclockwise to close the limit switch 265 after about 5° of pivoting of the arm 274. The arm 274 continues to be pivoted by the first inclined surface 275 of the dog 272 until a straight bottom surface 276 on the dog 272 engages the roller 273. As the straight bottom surface 276 rides over the roller 273 on the end of the arm 274 of the limit switch 265, it maintains contact therewith so that the arm 274 cannot return to its initial open position until after the bottom film 198 (see FIG. 24) is cut. The position of the dog 272 (see FIG. 34) when the rollers 270 (see FIG. 24) engage the second roller 208 is shown in phantom in FIG. 34. The maximum counterclockwise pivoted position of the arm 274 is shown by the phantom position of the roller 273 to the left of the arm 274 in FIG. 34.

When the shaft 268 (see FIG. 26) is rotated in the opposite direction by the motor 271, a second inclined surface 277 (see FIG. 34) of the dog 272 engages the roller 273 on the end of the arm 274 to pivot the arm 274 clockwise until the dog 272 returns to its rest or start position (solid line position of FIG. 34). The limit switch 265 is not closed when the arm 274 pivots clockwise beyond its initial open position but only when it pivots counterclockwise. The maximum clockwise pivoted position of the arm 274 is shown by the phantom position of the roller 273 to the right of the arm 274 in FIG. 34.

With the rollers 270 (see FIG. 24) engaging the second roller 208 as shown in phantom in FIG. 24, the motor 237 (see FIG. 25) is connected to the second roller 208 by the connecting means 238, and the motor 237 is energized to cause the second roller 208 to rotate until the bottom film 198 (see FIG. 24) is rolled over on itself to lock the bottom film 198 to the second roller 208. Then, the wrapper arm means 252 is returned to its start position by reversing the motor 271 (see FIG. 26).

The first roller 205 (see FIG. 24), which is full, is now manually removed from the carrier 206, and an empty roller is disposed on the carrier 206 at the three o'clock position. The first roller 205 with the pieces 11 (see FIG. 30) and the bottom film 198 is then stored in a freezer or other low temperature ambient having a temperature such as 0° F., for example.

Considering the operation of the present invention, the automatic motions of the apparatus 10 (see FIG. 1) are under the control of various selected computer programs used with the ACRAMATIC 975C CNC CONTROL. The carrousel 17 is rotated by a motor (not shown) to position a selected one of the supply rolls 18 at the position at which the composite assembly 14 thereon can be advanced therefrom for cutting by the cutter 29. Then, the take-up roll 22 is activated to advance the composite assembly 14 towards the cutter 29 through removing the top film 21 from the composite assembly 14. The first gantry 26 is then moved from its parked position of FIG. 4 to dispose the gripper 25 (see FIG. 15) on the first gantry 26 (see FIG. 14) so that the gripper 25 (see FIG. 15) can grasp the end of the composite sheet material 19 (see FIG. 29) and the backing 20 of the composite assembly 14 extending beyond the jaws 23 (see FIG. 17) and 24.

The first gantry 26 (see FIG. 14) is then moved to the right in FIG. 1 to pull the composite sheet material 19 (see FIG. 29) and the backing 20 of the composite assembly 14 until the distance from the free end of the composite assembly 14 to the cutter 29 (see FIG. 1) is the desired length of the segment 12 to be cut by the cutter 29. After cutting of the segment 12 by the cutter 29 is completed, the gripper 25 (see FIG. 15) releases the end of the cut segment 12 (see FIG. 1) and the segment 12 falls onto the porous conveyor belt 30. After the pinch roller 39 (see FIG. 19) on the first gantry 26 (see FIG. 1) smooths the end of the cut segment 12 remote from the cutter 29 (see FIG. 1), the first gantry 26 is then advanced to the left in FIG. 1 so that the gripper 25 (see FIG. 15) can again grip the portion of the composite sheet material 19 (see FIG. 29) and the backing 20 of the composite assembly 14 on the supply roll 18 (see FIG. 1) extending beyond the jaws 23 (see FIG. 17) and 24. Of course, another of the supply rolls 18 (see FIG. 1) could have been disposed at the position at which the composite assembly 14 is to be removed from the supply roll 18 through rotating the carrousel 17 after cutting of the segment 12.

While the first gantry 26 is being moved to the left in FIG. 1, the porous conveyor belt 30 is activated to move the cut segment 12 to the position shown in FIG. 2. This results in the second of the segments 12 having its front end very close to the rear end of the first of the segments 12. The remainder of the operation of cutting each of the segments 12 from the composite assembly 14 (see FIG. 1) and positioning the segment 12 on the porous conveyor belt 30 is the same as previously described. However, when the last of the segments 12 has been disposed on the porous conveyor belt 30, there is movement of the porous conveyor belt 30 to the right in FIG. 3 to dispose the segments 12 as shown in FIG. 3 whereby all of the segments 12 of the porous conveyor belt 30 are disposed over some or all of the vacuum chambers 75 (see FIG. 27). As previously discussed, a minimum vacuum is applied at all times to each of the vacuum chambers 75.

With the segments 12 (see FIG. 3) disposed on the porous conveyor belt 30 as shown in FIG. 3, the first gantry 26 now is moved to enable the ink jet marker 28 (see FIG. 16) on the first gantry 26 to mark the boundary of the piece 11 (see FIG. 8) to be placed on each of the pieces 11, which are to be cut from the segment 12, during assembly of the pieces 11 to form a composite part and to apply any desired identification indicia to each of the pieces 11 to be cut from the segment 12. This is accomplished through the ink jet marker 28 (see FIG. 16) moving orthogonal to the longitudinal movement of the first gantry 26 along the support rails 27.

Upon completion of marking of the segments 12 (see FIG. 3) by the ink jet marker 28 (see FIG. 16), the first gantry 26 is moved to the left to its parked position as shown in FIG. 4. Then, the second gantry 63 is moved from its parked position, as shown in FIG. 3, adjacent the auxiliary conveyor 177 (see FIG. 27) to the left in FIG. 4 to dispense the top protective film 61 (see FIG. 22) from the supply spool 62 on the second gantry 63.

The second gantry 63 is moved initially only to provide the protective film 61 over the first of the segments 12 (see FIG. 4). Then, the third gantry 64 is moved from its parked position, as shown in FIG. 3, adjacent the auxiliary conveyor 177 (see FIG. 27) for disposition over the first of the segments 12 (see FIG. 4) to be cut. The second gantry 63 then proceeds to the left in FIG. 4 to dispose the protective film 61 over the remaining of the segments 12 in advance of the movement of the third gantry 64.

Longitudinal movement of the third gantry 64 in conjunction with movement of the cutter 74 (see FIG. 20) orthogonal to the longitudinal movement of the third gantry 64 produces any desired shape of the piece 11 (see FIG. 8) in the segment 12. This includes the circular holes 15, for example, in one of the pieces 11 through rotating the reciprocating knife blades 132 (see FIG. 9) and 133 about the vertical axis of the steering shaft 164.

During cutting of the first of the segments 12 (see FIG. 4), the vacuum in the vacuum chamber 75 (see FIG. 27) therebeneath is increased by moving the butterfly valve in the butterfly housing 75G to its full open position. This increased vacuum holds the segment 12 (see FIG. 4) against movement.

After cutting of the first of the segments 12 is completed, the procedure is repeated with each of the remaining segments 12 on the porous conveyor belt 30. Of course, the vacuum in each of the vacuum chambers 75 (see FIGS. 27 and 28) is reduced after cutting of the segment 12 (see FIG. 4) thereover is completed while the vacuum chamber 75 (see FIGS. 27 and 28) beneath the next of the segments 12 (see FIG. 4), which is being cut, is increased.

After cutting of the segments 12 on the porous conveyor belt 30 is completed, the third gantry 64 is returned to its parked position adjacent the auxiliary conveyor 177 (see FIG. 27). Next, the porous conveyor belt 30 is activated as is the motor, which drives the pinch roll 66 (see FIG. 23), the drive roller 178, and the bottom film drive roller 200, so that all of them will be driven at the same rate that the motor 56 (see FIG. 27) drives the porous conveyor belt 30.

The second gantry 63 (see FIG. 22) is then moved along the rails 27 at the same speed as the porous conveyor belt 30 through either being locked thereto by the lock pin 179 or having its drive motor energized at the same rate of speed as the motor 56 (see FIG. 27) driving the porous conveyor belt 30. Either the skid bar 67 (see FIG. 22) or the roller 68, which has been used to dispose the top protective film 61 on the last of the segments 12 (see FIG. 4) to the left, remains in its advanced position to press the top protective film 61 against the porous conveyor belt 30; this prevents additional of the top protective film 61 from being pulled from the supply spool 62 (see FIG. 22).

The top protective film 61 is cut only where the pieces 11 (see FIG. 8) are cut from the segments 12. Accordingly, there is a continuous strip of the protective film 61 (see FIG. 23) extending between the pinch rolls 66 and 66' and the supply spool 62 (see FIG. 22) on the second gantry 63. The second gantry 63 will be eventually parked adjacent the auxiliary conveyor 177 (see FIG. 23) and to the left of the third gantry 64 as shown in FIG. 5.

Because of the porous conveyor belt 30 passing around the roller 56E (see FIG. 27), the lock pin 179 (see FIG. 22) on the second gantry 63 would be removed from its connection to the porous conveyor belt 30. Of course, if the second gantry 63 (see FIG. 5) is moved by its motor rather than being locked to the porous conveyor belt 30, the motor for the second gantry 63 would be deenergized to stop it at the parked position.

As the protective film 61 (see FIG. 23) is pulled by the pinch rolls 66 and 66', the separating means 180 is effective to remove each of the pieces 11 (see FIG. 8) from each of the segments 12 with the remainder of each of the segments 12 constituting the scrap that passes between the pinch rolls 66 (see FIG. 23) and 66'. Each of the pieces 11 is advanced onto the bottom film 198, which is being advanced by the drive roller 200. This advances each of the pieces 11 to be wrapped around the first roller 205 (see FIG. 5) with the bottom film 198.

After all of the pieces 11 (see FIG. 30) have been advanced onto the first roller 205 (see FIG. 5), the motor 56 (see FIG. 27) driving the porous conveyor belt 30 is stopped and the motor, which drives the pinch roll 66 (see FIG. 23), the drive roller 178, and the drive roller 200, is deenergized. Then, the steps of the cutter 29 (see FIG. 1) cutting the segments 12, loading the segments 12 on the porous conveyor belt 30, marking the segments 12 (see FIG. 3), covering the segments 12 (see FIG. 4) with the protective film 61, cutting the pieces 11 (see FIG. 8) from the segments 12, and advancing the pieces 11 to the first roller 205 (see FIG. 5) are repeated.

When the first roller 205 is filled with the pieces 11 (see FIG. 30) wrapped therearound by the bottom film 198, the carrier 206 (see FIG. 25) is rotated 180° counterclockwise from the position of FIG. 5 to the position of FIG. 6. Next, the wrapper arm means 252 (see FIG. 7) is activated by energization of the motor 271 (see FIG. 26) to move the bottom film 198 (see FIG. 7), which extends from the supply spool 199 to the first roller 205, so that the bottom film 198 is cut by the electrical wire 253 prior to the wrapper arm means 252 causing the bottom film 198 to be wrapped partially around the second roller 208. Then, the second roller 208 is rotated counterclockwise by energization of the motor 237 (see FIG. 25) to wrap the bottom film 198 (see FIG. 24) therearound. It should be understood there is no advancement of the bottom film 198 by the drive roller 200 (see FIG. 23) when the bottom film 198 is wrapped around the second roller 208 (see FIG. 24). Thus, the amount of rotation of the second roller 208 is in accordance with the amount of the bottom film 198 that is cut by the hot wire 253.

While the segments 12 (see FIG. 1) have been shown as being produced by the cutter 29 cutting the composite assembly 14 supplied from one of the supply rolls 18 on the carrousel 17, it should be understood that there could be only one of the supply rolls 18, if desired, and the carrousel 17 would not be employed. Furthermore, it should be understood that each of the segments 12 could be cut elsewhere and placed on the porous conveyor belt 30, either automatically or manually. This would eliminate the need for the gripper 25 (see FIG. 15).

It also should be understood that it is not a requisite for satisfactory operation to have the segments 12 (see FIG. 8) marked in the areas of the pieces 11 to be cut therefrom with the boundaries of the piece or pieces 11 to be placed thereon when forming a composite part from the pieces 11 or for there to be any indicia thereon. Thus, the first gantry 26 (see FIG. 1) could be omitted if no gripping or marking were required.

If desired, the shaft 268 (see FIG. 26) could be rotated by an air cylinder having its piston rod connected by suitable means to the shaft 268 rather than the motor 271. This is because the amount of rotation in each direction of the shaft 268 is a fixed angle less than 90°.

An advantage of this invention is that a good piece can be cut inside another good piece. Another advantage of this invention is that cut pieces may be stored to prevent aging of the epoxy if there is to be a delay in using the pieces. A further advantage of this invention is that a high speed cutter is provided without the inherent noise usually produced.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A method for producing shaped composite pieces from composite sheet material including:
   transporting composite sheet material from a supply source to a cutting position;
   cutting the composite sheet material at the cutting position into segments;
   transporting each of the cut segments of the composite sheet material to a support for supporting each of the cut segments;
   cutting each of the cut segments of the composite sheet material supported by the support into at least one piece having any selected shape;
   advancing each of the pieces having a selected shape from the support;
   and separating each of the pieces having a selected shape from the remainder of each of the cut segments of the composite sheet material after advancement from the support.

2. The method according to claim 1 including selectively marking each of the cut segments of the composite sheet material in any area corresponding to one of the pieces of a selected shape to be cut therefrom prior to cutting each of the segments into the pieces.

3. The method according to claim 2 including adding a top protective film to each of the cut segments of the composite sheet material after marking is completed and prior to cutting each of the cut segments of the composite sheet material into at least the one piece.

4. The method according to claim 3 including adding a bottom film to each of the separated pieces of a selected shape after each of the separated pieces of a selected shape has been separated from the remainder of each of the cut segments of the composite sheet material.

5. An apparatus for producing shaped composite pieces from composite sheet material including:

a source of supply of a plurality of segments of composite sheet material;

support means for supporting each of the segments of the composite sheet material in a selected arrangement;

cutting means for cutting each of the segments of the composite sheet material supported by said support means into at least one piece having a selected shape, said cutting means including:

a pair of reciprocating knife blades;

first support means for supporting one of said reciprocating knife blades, said first support means including a pair of first cam follower means riding on said first cam surface and a pair of second cam follower means riding on said second cam surface, said pair of first cam follower means being displaced 180° from each other and said pair of second cam follower means being displaced 180° from each other, one of said pair of first cam follower means and one of said pair of second cam follower means being adjacent each other so as too not be displaced relative to each other with respect to said first cam surface and said second cam surface and the other of said pair of first cam follower means and the other of said pair of second cam follower means being adjacent each other so as to not be displaced relative to each other with respect to said first cam surface and said second cam surface;

second support means for supporting the other of said reciprocating knife blades, said second support means including a pair of first cam follower means riding on said first cam surface and a pair of second cam follower means riding on said second cam surface, said pair of first cam follower means being displaced 180° from each other and said pair of second cam follower means being displaced 180° from each other, one of said pair of first cam follower means and one of said pair of second cam follower means being adjacent each other so as to not be displaced relative to each other with respect to said first cam surface and said second cam surface and the other of said pair of first cam follower means and the other of said pair of second cam follower means being adjacent each other so as to not be displaced relative to each other with respect to said first cam surface and said second cam surface;

each of said pair of first cam follower means of said first support means being displaced 90° from each of said pair of first cam follower means of said second support means;

and each of said pair of second cam follower means of said first support means being displaced 90° from each of said pair of second cam follower means of said second support means;

and single drive means for always reciprocating each of said first support means and said second support means in opposite directions so that said pair of reciprocating knife blades always reciprocate in opposite directions, said single drive means including rotating cam means for acting on each of said first support means and said second support means to produce reciprocation of said pair of reciprocating knife blades in opposite directions, and said rotating cam means including a first cam surface and a second cam surface spaced from said first cam surface;

first relative moving means for producing relative movement between said cutting means and said support means to enable cutting of each segment of the composite sheet material into at least the one piece having the selected shape;

separating means for separating each of the pieces having a selected shape from the remainder of each of the segments of the composite sheet material;

and causing means for causing movement of each of the segments of the composite sheet material from said support means to said separating means after each of the segments of the composite sheet material has been cut by said cutting means.

6. A cutter for cutting sheet material including:

a pair of reciprocating knife blades;

first support means for supporting one of said reciprocating knife blades, said first support means including a pair of first cam follower means riding on said first cam surface and a pair of second cam follower means riding on said second cam surface, said pair of first cam follower means being displaced 180° from each other and said pair of second cam follower means being displaced 180° from each other, one of said pair of first cam follower means and one of said pair of second cam follower means being adjacent each other so as to not be displaced relative to each other with respect to said first cam surface and said second cam surface and the other of said pair of first cam follower means and the other of said pair of second cam follower means being adjacent each other so as to not be displaced relative to each other with respect to said first cam surface and said second cam surface;

second support means for supporting the other of said reciprocating knife blades, said second support means including a pair of first cam follower means riding on said first cam surface and a pair of second cam follower means riding on said second cam surface, said pair of first cam follower means being displaced 180° from each other and said pair of second cam follower means being displaced 180° from each other, one of said pair of first cam follower means and one of said pair of second cam follower means being adjacent each other so as to not be displaced relative to each other with respect to said first cam surface and said second cam surface and the other of said pair of first cam follower means and the other of said pair of second cam follower means being adjacent each other so as to not be displaced relative to each other with respect to said first cam surface and said second cam surface; each of said pair of first cam follower means of said first support means being displaced 90° from each of said pair of first cam follower means of said second support means; and each of said pair of second cam follower means of said first support means being displaced 90° from each of said pair of second cam follower means of said second support means;

and single drive means for always reciprocating each of said first support means and said second support means in opposite directions, so that said pair of reciprocating knife blades always reciprocate in opposite directions, said single drive means including rotating cam means for acting on each of said first support means and said second support means to produce reciprocation of said pair of reciprocating knife blades in opposite directions, and said rotating means including a first cam surface and a second cam surface spaced from said first cam surface.

* * * * *